United States Patent
Zhang

(10) Patent No.: US 11,849,374 B2
(45) Date of Patent: Dec. 19, 2023

(54) METHOD AND DEVICE USED FOR WIRELESS RELAY COMMUNICATION FOR REPORTING CHARGING INFORMATION UTILIZING DATA FROM IDENTITY SETS

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/097,184

(22) Filed: Jan. 13, 2023

(65) Prior Publication Data
US 2023/0156438 A1    May 18, 2023

Related U.S. Application Data

(63) Continuation of application No. 17/376,169, filed on Jul. 15, 2021, now Pat. No. 11,595,794.

(30) Foreign Application Priority Data

Jul. 16, 2020  (CN) .......................... 202010686444.0

(51) Int. Cl.
| | | |
|---|---|---|
| *H04W 4/00* | (2018.01) | |
| *H04W 4/24* | (2018.01) | |
| *H04M 15/00* | (2006.01) | |
| *H04W 88/04* | (2009.01) | |
| *H04W 72/20* | (2023.01) | |
| *H04W 4/46* | (2018.01) | |

(52) U.S. Cl.
CPC ............. *H04W 4/24* (2013.01); *H04M 15/67* (2013.01); *H04M 15/765* (2013.01); *H04M 15/8214* (2013.01); *H04W 72/20* (2023.01); *H04W 88/04* (2013.01); *H04W 4/46* (2018.02)

(58) Field of Classification Search
CPC ... H04W 4/24; H04W 72/0406; H04W 88/04; H04M 15/67; H04M 15/765; H04M 15/8214

See application file for complete search history.

(56) References Cited

U.S. PATENT DOCUMENTS

| 10,237,018 | B2 * | 3/2019 | Lee ........................... H04L 1/24 |
| 2011/0302014 | A1 * | 12/2011 | Proctor, Jr. ............. H04W 4/80 705/14.1 |
| 2019/0149449 | A1 * | 5/2019 | Morris .................... H04L 45/22 709/245 |

* cited by examiner

*Primary Examiner* — Pakee Fang

(57) ABSTRACT

The present disclosure method and device for wireless communications, comprising: operating a first data block set; and transmitting first charging information; a size of data in the first data block set is used to generate the first charging information, the first charging information comprises a first identity (ID) set, and the first ID set comprises a first ID and a second ID; the first ID is a link layer ID; the operating action is receiving, a destination ID field of a MAC header of a MAC PDU used to carry the first data block set comprises at least partial bits in a first ID, when a destination link layer ID list maintained by a node indicated by the second ID comprises the first ID. The present disclosure determines a receiver or a generator of a first data block set, which improves accuracy of charging and enriches charging types of services.

20 Claims, 7 Drawing Sheets

METHOD AND DEVICE USED FOR WIRELESS RELAY COMMUNICATION FOR REPORTING CHARGING INFORMATION UTILIZING DATA FROM IDENTITY SETS

CROSS REFERENCE TO RELATED APPLICATIONS

This application is the continuation of the U.S. patent application Ser. No. 17/376,169, filed on Jul. 15, 2021, which claims the priority benefit of Chinese Patent Application CN202010686444.0, filed on Jul. 16, 2020, the full disclosure of which is incorporated herein by reference.

BACKGROUND

Technical Field

The present disclosure relates to transmission methods and devices in wireless communication systems, and in particular to a method and device for reporting user information, ensuring data consistency and charging in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In communications, whether Long Term Evolution (LTE) or 5G NR involves features of accurate delivery of reliable information, optimized energy efficiency ratio, determination of information efficiency, flexible resource allocation, scalable system structure, efficient non-access layer information processing, low service interruption and dropping rate, high security and privacy and support for low-power consumption, which are of great significance to the maintenance of normal communications between a base station and a UE, reasonable scheduling of resources and balancing of system payload. Those features can be called the cornerstone of high throughout and are characterized in meeting communication requirements of various services, as well as improving spectrum utilization and service quality, which are indispensable in enhanced Mobile BroadBand (eMBB), Ultra Reliable Low Latency Communications (URLLC) and enhanced Machine Type Communications (eMTC). Meanwhile, in the following communication modes, covering Industrial Internet of Things (IIoT), Vehicular to X (V2X), Device to Device communications, Unlicensed Spectrum communications, User communication quality monitoring, network planning optimization, Non-Territorial Networks (NTN), Territorial Networks (TN), Dual connectivity system, radio resource management and multi-antenna codebook selection, primary-link or sidelink communications, safe near field communications, networks involving relays, signaling design, adjacent cell management, service management and beamforming, extensive requirements of these features exist. Transmission methods of information are divided into broadcast and unicast, both of which are essential for 5G systems for that they are very helpful to meet the above requirements.

With the increase of scenarios and complexity of systems, higher requirements are raised for reducing interruption rate and time delay, enhancing reliability and system stability, increasing service flexibility and saving power. Meanwhile, compatibility between different versions of different systems should be taken into account when designing the systems.

SUMMARY

In a variety of communication scenarios, such as in a UE-to-UE communication scenario where a relay exists between UEs, due to reasons of the lack of management of a central node and distributed generation of UE information, some information cannot be acquired by the network, and a UE cannot acquire another UE's information, resulting in a series of problems in management, especially in charging. As a relay node, when using unicast communication to relay, there exist one or more unicast links between the relay node and other nodes. There may be a plurality of nodes forwarded by the relay node, and different nodes may also have communication requirements on the relay node. When different links appear at the same time, the relationships of these links need to be dealt with, these links may be links on physical layer, link layer or layer 3. The charging involved in communications between UEs is different from the usual charging in that the charging is based on the reporting of users; which services are owned by a relay node and which services are relayed to other UEs need to be distinguished clearly to the relay node as well as to the network statistics, since this may involve different statistics and charging requirements, and if the charging information cannot be unified, the complexity of the network processing may be increased. On the other hand, in communications between UEs, it is better that information reported by different nodes can be referred to each other for checking, which cannot be achieved by the existing data statistics and the reporting methods. At the same time, due to the reasons of privacy or security, the relay UE may not be able to acquire all information of the other UEs, which brings new difficulties to the generation and reporting of charging information, especially when a link layer identity (ID) between UEs is updated. Therefore, a comprehensive solution is needed, which can not only ensure the security and privacy, but also solve generation of charging information of various links, where the method needs to be of low complexity and the charging information is easy to process.

To address the above problem, the present disclosure provides a solution.

It should be noted that if no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

The present disclosure provides a method in a first node for wireless communications, comprising:
  operating a first data block set; and
  transmitting first charging information;
  herein, a size of data in the first data block set is used to generate the first charging information, the first charging information comprises a first ID set, and the first ID set comprises a first ID and a second ID; the first ID is a link layer ID; the operating action is receiving, a destination ID field of a MAC header of a MAC PDU used to carry the first data block set comprises at least partial bits in a first ID, when a destination link layer ID list maintained by a node indicated by the second ID comprises the first ID, the first ID identifies a receiver of the first data block set, and when a destination link layer ID list maintained by a node indicated by the second ID does not comprise the first ID, the first ID does not indicate a receiver of the first data block set; or, the operating action is transmitting, a source ID field of a MAC header of a MAC PDU used to carry the first data block set comprises at least partial bits in a first ID, when a source link layer ID list maintained by a node indicated by the second ID comprises the first ID, the first ID indicates a generator of the first data block set, and when a source link layer ID list maintained by a node indicated by the second ID does not comprise the first ID, the first ID does not indicate a generator of the first data block set.

In one embodiment, a problem to be solved in the present disclosure includes: when UEs are in communications with each other, especially involving sidelink communications, users need to update their identities from time to time to ensure security, which could occur at any time, besides, the update of ID and transmission of data are independent, and the ID update of each link is also independent. However, when reporting charging information, since the network cannot acquire the latest users' identities, it may not exactly know the meaning of these new identities and which user these identities indicate; on the other hand, charging information reported by the relay node needs to indicate for which users or application or device or bearer or flow it serves, so that the network can charge correctly. The present disclosure indicates an ID of a receiver or a generator for different operations through a first ID and a second ID, thus solving the above problems.

In one embodiment, advantages of the above method include: in many cases, since the relay node can use the first ID and the second ID to indicate, the reported charging information is very simple with low complexity; on the other hand, when the charging information generated in the present disclosure is analyzed together with charging information reported by other related UEs, a unified flow or charging chain can be formed, which is conducive for the network to verify these information while a transmission of a great deal of unnecessary information is avoided. On the other hand, it can also ensure that the reported charging information is still clear when the ID is updated due to the privacy and other reasons.

In one embodiment, characteristics of the present disclosure include: a MAC is a Medium Access Control.

In one embodiment, characteristics of the present disclosure include: a PDU is a Protocol Data Unit.

Specifically, according to one aspect of the present disclosure, when the operating action is receiving, the first charging information is generated for data reception; and when the operating action is transmitting, the first charging information is generated for data transmission.

Specifically, according to one aspect of the present disclosure, the first charging information comprises first information, when the first charging information is generated for data reception, the first information is used to indicate whether the first ID identifies a receiver of the first data block set; when the first charging information is generated for data transmission, the first information is used to indicate whether the first ID identifies a generator of the first data block set.

Specifically, according to one aspect of the present disclosure, when the operating action is receiving and the first ID does not indicate a receiver of the first data block set, the second ID is used to indicate a receiver of the first data block set; when the operating action is transmitting and the first ID does not indicate a generator of the first data block set, the second ID is used to indicate a generator of the first data block set.

Specifically, according to one aspect of the present disclosure, when the operating action is receiving, the second ID is an IP address of a receiver of the first data block set; when the operating action is transmitting, the second ID is an IP address of a generator of the first data block set.

Specifically, according to one aspect of the present disclosure, the second ID is a first application layer ID, and the first application layer ID is an ID related to an application layer.

Specifically, according to one aspect of the present disclosure, the second ID is a first group ID, the first group ID identifies a first group, and the first group comprises a receiver of a first data block set and a generator of the first data block set.

Specifically, according to one aspect of the present disclosure, the second ID is a link layer ID.

Specifically, according to one aspect of the present disclosure, the second ID is a flow ID.

Specifically, according to one aspect of the present disclosure, when the operating action is receiving, and the first ID does not indicate a receiver of the first data block set, or, when the operating action is transmitting, and the first ID does not indicate a generator of the first data block set, the first charging information only comprises an IP address other than an IP address of the first node.

Specifically, according to one aspect of the present disclosure, when the operating action is receiving, and the first ID does not indicate a receiver of the first data block set, or, when the operating action is transmitting, and the first ID does not indicate a generator of the first data block set, the first charging information only comprises an application layer ID other than an application layer ID of the first node.

Specifically, according to one aspect of the present disclosure, when the operating action is receiving, and the first ID does not indicate a receiver of the first data block set, or, when the operating action is transmitting, and the first ID does not indicate a generator of the first data block set, the first charging information only comprises a link layer ID other than a link layer ID of the first node.

Specifically, according to one aspect of the present disclosure, comprising:
  when the first node has an IP address allocation function, the first transmitter transmits first information, and the first message configures an IP address of a transmitter of the first data block set; when the first node does not have an IP address allocation function, the first receiver receives a second message, and the second message indicates an IP address of a transmitter of the first data block set.

Specifically, according to one aspect of the present disclosure, an IP address of the first node and an IP address of a transmitter of the first data block set are at least the same in partial bits.

Specifically, according to one aspect of the present disclosure, comprising:
  the first transmitter, transmitting a fourth message, the fourth message comprising at least one ID in the first ID set.

Specifically, according to one aspect of the present disclosure, comprising:
the first receiver, receiving a third message, the third message being used to configure the first charging information, the third message being used to indicate a first collection period, the first data block set being operated within the first collection period, and the first transmitter, generating the first charging information for the first collection period.

Specifically, according to one aspect of the present disclosure, comprising:
the first receiver, receiving a first charging feedback message, the first charging feedback message indicating received charging information.

Specifically, according to one aspect of the present disclosure, comprising:
the first transmitter, transmitting a fifth message, the fifth message being used to synchronize collection periods of different nodes.

Specifically, according to one aspect of the present disclosure, the first node is a UE.

Specifically, according to one aspect of the present disclosure, the first node is an IoT terminal.

Specifically, according to one aspect of the present disclosure, the first node is a relay.

Specifically, according to one aspect of the present disclosure, the first node is a vehicle terminal.

Specifically, according to one aspect of the present disclosure, the first node is an aircraft.

The present disclosure provides a first node for wireless communications, comprising:
a first receiver, operating a first data block set; and
a first transmitter, transmitting first charging information;
herein, a size of data in the first data block set is used to generate the first charging information, the first charging information comprises a first ID set, and the first ID set comprises a first ID and a second ID; the first ID is a link layer ID; the operating action is receiving, a destination ID field of a MAC header of a MAC PDU used to carry the first data block set comprises at least partial bits in a first ID, when a destination link layer ID list maintained by a node indicated by the second ID comprises the first ID, the first ID identifies a receiver of the first data block set, and when a destination link layer ID list maintained by a node indicated by the second ID does not comprise the first ID, the first ID does not indicate a receiver of the first data block set; or, the operating action is transmitting, a source ID field of a MAC header of a MAC PDU used to carry the first data block set comprises at least partial bits in a first ID, when a source link layer ID list maintained by a node indicated by the second ID comprises the first ID, the first ID indicates a generator of the first data block set, and when a source link layer ID list maintained by a node indicated by the second ID does not comprise the first ID, the first ID does not indicate a generator of the first data block set.

In one embodiment, the present disclosure has the following advantages over conventional schemes:
the method proposed in the present disclosure, in the process of the update of user's identities, especially when the network cannot acquire these updated identities and the relay node cannot acquire privacy information of other nodes, the generated charging information can still carry enough information to meet charging requirements of the core network. The present disclosure determines a generator or a receiver of data through a first ID and a second ID, where these identities can be compared and associated with the charging information transmitted by the generator and the receiver respectively, and the network can accurately acquire related data statistics through comparison and association so as to perform charging.

In one embodiment, the present disclosure has the following advantages over conventional schemes:
the method proposed in the present disclosure allows the charging information generated by the relay node to clearly indicate whether a size of received or transmitted data is for the relay node or is forwarded to other nodes and specifically to which nodes, and whether it is from other nodes or is ready to be transmitted to other nodes, which are necessary for charging related to relay. However, the conventional scheme cannot support the charging function of communications between UEs involving a relay.

In one embodiment, the present disclosure has the following advantages over conventional schemes:
the method proposed in the present disclosure is suitable for both receiving and transmitting, which is a unified solution. In addition, charging information generated by the node has a unified format with the largest possibility. The first ID and the second ID, in different cases, can indicate different nodes, which is conducive to increasing the scalability of the solution, so that a plurality of chains are supported to transmit-receive and relay at the same time. Meanwhile, when the network processes the charging information, it can quickly process the data according to different situations, which is conducive to reducing the complexity of network. This is not supported by the conventional scheme.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
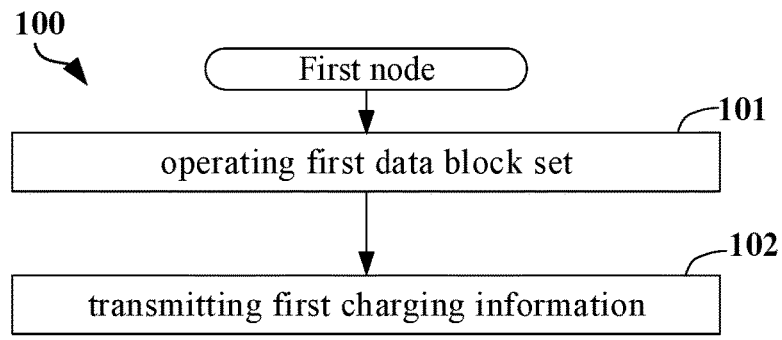
FIG. 1 illustrates a flowchart of operating a first data block set and transmitting first charging information according to one embodiment of the present disclosure.

Embodiment 1 illustrates a flowchart of operating a first data block set and transmitting first charging information according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, a size of data in the first data block set is used to generate the first charging information, the first charging information comprises a first ID set, and the first ID set comprises a first ID and a second ID; the first ID is a link layer ID; the operating action is receiving, a destination ID field of a MAC header of a MAC PDU used to carry the first data block set comprises at least partial bits in a first ID, when a destination link layer ID list maintained by a node indicated by the second ID comprises the first ID, the first ID identifies a receiver of the first data block set, and when a destination link layer ID list maintained by a node indicated by the second ID does not comprise the first ID, the first ID does not indicate a receiver of the first data block set; or, the operating action is transmitting, a source ID field of a MAC header of a MAC PDU used to carry the first data block set comprises at least partial bits in a first ID, when a source link layer ID list maintained by a node indicated by the second ID comprises the first ID, the first ID indicates a generator of the first data block set, and when a source link layer ID list maintained by a node indicated by the second ID does not comprise the first ID, the first ID does not indicate a generator of the first data block set.

In one embodiment, the first node is a UE.

In one embodiment, the first node is a relay.

In one embodiment, the first node is a UE-UE relay.

In one embodiment, the first node is a UE-to-UE relay.

In one embodiment, the first data block set transmits or receives through one-to-many communications.

In one embodiment, the first data block set transmits or receives through one-to-one communications.

In one embodiment, the first data block set is received by the first node through one-to-many communications, and is transmitted by the first node through one-to-one communications.

In one embodiment, the first data block set is received by the first node through one-to-one communications, and is transmitted by the first node through one-to-many communications.

In one embodiment, the first data block set at least comprises one data block.

In one embodiment, the data block comprises K bit(s), K being a positive integer.

In one embodiment, the data block comprises a PDU.

In one embodiment, the data block comprises an SDU.

In one embodiment, the first data block set is transmitted via a PC5.

In one embodiment, the first data block set is received via a PC5.

In one embodiment, the first data block set is transmitted or received via a PC5.

In one embodiment, the first data block set comprises IP data.

In one embodiment, the first data block set comprises an IP packet.

In one embodiment, the first data block set comprises Non-IP data.

In one embodiment, the first data block set comprises Non-IP structural data.

In one embodiment, the first data block set comprises NAS data.

In one embodiment, the first data block set comprises PC5-S data.

In one embodiment, the first data block set comprises PC5-RRC data.

In one embodiment, the first data block set comprises a SDAP PDU.

In one embodiment, the first data block set comprises a PDCP PDU.

In one embodiment, the first data block set comprises an RLC PDU.

In one embodiment, the first data block set comprises a MAC PDU.

In one embodiment, the first data block set comprises physical-layer data.

In one embodiment, the first charging information is used for charging.

In one embodiment, the first charging information comprises usage information.

In one embodiment, the first charging information comprises user information.

In one embodiment, the first charging information comprises a usage information report.

In one embodiment, the first charging information comprises a user information report.

In one embodiment, the first charging information comprises a device information report.

In one embodiment, the first charging information is only for relayed data.

In one subembodiment of the above embodiment, the first data block set is data needed to be relayed or data is relayed or data will be relayed.

In one embodiment, the first charging information comprises a USAGE_INFORMATION_REPORT_LIST.

In one embodiment, the first charging information is part of a USAGE_INFORMATION_REPORT_LIST.

In one embodiment, the first charging information is UsageInformationReportList-Info in a USAGE_INFORMATION_REPORT_LIST.

In one embodiment, the first charging information is a usage-information-report in a USAGE_INFORMATION_REPORT_LIST.

In one embodiment, the first charging information comprises Transmission-info in a USAGE_INFORMATION_REPORT_LIST.

In one embodiment, the first charging information comprises Reception-info in a USAGE_INFORMATION_REPORT_LIST.

In one embodiment, when the operating action is receiving, the first charging information is generated for data reception; and when the operating action is transmitting, the first charging information is generated for data transmission.

In one embodiment, the phrase of "the first charging information is generated for data reception" includes the following meaning: a size of data comprised or counted by the first charging information only comprises a size of received data.

In one embodiment, the phrase of "the first charging information is generated for data reception" includes the following meaning: a size of data comprised or counted by the first charging information only comprises a size of data received when the operating action is receiving.

In one embodiment, the phrase of "the first charging information is generated for data reception" includes the following meaning: a size of data comprised or counted by the first charging information only comprises a size of data received by the first node when the operating action is receiving.

In one embodiment, the phrase of "the first charging information is generated for data transmission" includes the following meaning: a size of data comprised or counted by the first charging information only comprises a size of received data.

In one embodiment, the phrase of "the first charging information is generated for data transmission" includes the following meaning: a size of data comprised or counted by the first charging information only comprises a size of data transmitted when the operating action is transmitting.

In one embodiment, the phrase of "the first charging information is generated for data transmission" includes the following meaning: a size of data comprised or counted by the first charging information only comprises a size of data transmitted by the first node when the operating action is transmitting.

In one embodiment, the phrase of "the first charging information is generated for data reception" includes the following meaning: a size of data counted by the first charging information only comprises a size of transmitted data.

In one embodiment, when the first charging information is generated for data reception, the first charging information comprises information other than Transmission-info.

In one embodiment, when the first charging information is generated for data transmission, the first charging information only comprises information other than Reception-info.

In one embodiment, when the first charging information is generated for data reception, the first charging information only comprises information related to received data.

In one embodiment, when the first charging information is generated for data transmission, the first charging information only comprises information related to transmitted data.

In one embodiment, the first node is in coverage, and the first charging information is transmitted; when the first node is out of coverage, the first charging information is generated first, then stored, and transmitted after the first node enters into the coverage.

In one embodiment, the first charging information is transmitted via a PC3ch interface.

In one embodiment, the first ID set only comprises the first ID and the second ID.

In one embodiment, the first ID set comprises an ID other than the first ID and the second ID.

In one embodiment, the first data block set is carried by one or more MAC PDUs.

In one embodiment, the first data block set is carried as a MAC SDU of one or more MAC PDUs.

In one embodiment, a destination ID field of a MAC header of a MAC PDU used to carry the first data block set is a DST field.

In one embodiment, a source ID field of a MAC header of a MAC PDU used to carry the first data block set is an SRC field.

In one embodiment, a destination ID field of a MAC header of a MAC PDU used to carry the first data block set comprises 16 most significant bits in the first ID.

In one embodiment, a destination ID field of a MAC header of a MAC PDU used to carry the first data block set comprises that a number of bits in the first ID is configured.

In one embodiment, a destination ID field of a MAC header of a MAC PDU used to carry the first data block set comprises 8 most significant bits in the first ID.

In one embodiment, a destination ID field of a MAC header of a MAC PDU used to carry the first data block set comprises that a number of bits in the first ID is configured.

In one embodiment, a source ID field of a MAC header of a MAC PDU used to carry the first data block set comprises at least partial bits in the first ID.

In one embodiment, a source ID field of a MAC header of a MAC PDU used to carry the first data block set comprises 16 most significant bits in the first ID.

In one embodiment, a source ID field of a MAC header of a MAC PDU used to carry the first data block set comprises that a number of bits in the first ID is configured.

In one embodiment, a source ID field of a MAC header of a MAC PDU used to carry the first data block set comprises at least partial bits in the first ID.

In one embodiment, a source ID field of a MAC header of a MAC PDU used to carry the first data block set comprises 8 most significant bits in the first ID.

In one embodiment, a source ID field of a MAC header of a MAC PDU used to carry the first data block set comprises that a number of bits in the first ID is configured.

In one embodiment, the link layer ID comprises a Link layer identifier.

In one embodiment, the link layer ID comprises a Link layer identity.

In one embodiment, the link layer ID comprises a Link layer ID.

In one embodiment, the link layer ID comprises a Layer2 ID.

In one embodiment, the link layer ID comprises a Layer-2 ID.

In one embodiment, the link layer ID comprises a L2 ID.

In one embodiment, the first ID is a prose-UE-id.

In one embodiment, the first ID is an element in the first charging information.

In one embodiment, the second ID is an element in the first charging information.

In one embodiment, a size of data in the first data block set is an element in the first charging information.

In one embodiment, a MAC PDU used to carry the first data block set is transmitted at a PC5 interface.

In one embodiment, a physical channel occupied by a MAC PDU used to carry to the first data block set comprises a Physical sidelink shared channel (PSSCH).

In one embodiment, a logical channel occupied by a MAC PDU used to carry to the first data block set comprises a Sidelink control channel (SCCH).

In one embodiment, a logical channel occupied by a MAC PDU used to carry to the first data block set comprises a Sidelink traffic channel (STCH).

In one embodiment, the first charging information comprises first information, when the first charging information is generated for data reception, the first information is used to indicate whether the first ID identifies a receiver of the first data block set; when the first charging information is generated for data transmission, the first information is used to indicate whether the first ID identifies a generator of the first data block set.

In one embodiment, the first data block set is transmitted through an SL-SCH.

In one embodiment, the first data block set is transmitted through sidelink.

In one subembodiment of the embodiment, the first information is an indicator.

In one subembodiment of the embodiment, the first information is a flag.

In one subembodiment of the embodiment, the first information indicates whether the first data block set needs to be relayed.

In one subembodiment of the embodiment, the first information indicates whether the first data block set is relayed.

In one subembodiment of the embodiment, the first information indicates whether the first node is relayed.

In one subembodiment of the embodiment, the first information indicates whether the operating action is used for relaying.

In one subembodiment of the embodiment, the first information implicitly indicates whether the first data block set is relayed, and when the first ID and the second ID are used to indicate different nodes, the first data block set is relayed; when the first ID and the second ID are used to indicate a same node, the first data block set is not relayed.

In one embodiment, when the operating action is receiving and the first ID does not indicate a receiver of the first data block set, the second ID is used to indicate a receiver of the first data block set; when the operating action is transmitting and the first ID does not indicate a generator of the first data block set, the second ID is used to indicate a generator of the first data block set.

In one embodiment, when the second ID is used to indicate a receiver of the first data block set, the second ID is an ID of a receiver of the first data block set.

In one embodiment, when the second ID is used to indicate a receiver of the first data block set, the second ID identifies a receiver of the first data block set.

In one embodiment, when the second ID is used to indicate a receiver of the first data block set, the second ID can uniquely determine a receiver of the first data block set.

In one embodiment, when the second ID is used to indicate a receiver of the first data block set, the second ID can uniquely determine a receiver of the first data block set within a certain range.

In one embodiment, when the second ID is used to indicate a generator of the first data block set, the second ID is an ID of a generator of the first data block set.

In one embodiment, when the second ID is used to indicate a generator of the first data block set, the second ID identifies a generator of the first data block set.

In one embodiment, when the second ID is used to indicate a generator of the first data block set, the second ID can uniquely determine a generator of the first data block set.

In one embodiment, when the second ID is used to indicate a generator of the first data block set, the second ID can uniquely determine a generator of the first data block set within a certain range.

In one embodiment, a receiver of the first data block set is a receiver of the first data after being relayed.

In one embodiment, a generator of the first data block set is a transmitter of the first data block before being relayed.

In one embodiment, when the operating action is receiving, the first node transmits a second MAC PDU set, the second MAC PDU set carries the first data block set, and a node indicated by a destination ID field of a MAC PDU header comprised in the second MAC PDU set is a receiver of a first data block set.

In one embodiment, when the operating action is transmitting, a MAC PDU set used to carry the first data block set is generated by a first MAC PDU set, the first node receives the first MAC PDU set, the first MAC PDU set carries the first data block set, and a node indicated by a source ID field of a MAC PDU header of the first MAC PDU is a generator of the first data block set.

In one embodiment, when the operating action is receiving and the first data block set is data that needs to be relayed, the first ID is used to indicate the first node, a receiver of the first data block set is a receiver of the first data after being relayed, the receiver of the first data block set is a node other than the first node, and the second ID is used to indicate a receiver of the first data block set.

In one subembodiment of the embodiment, the first information indicates data when the first data block set needs to be relayed.

In one embodiment, when the operating action is transmitting and the first data block set is relayed data, the first ID is used to indicate the first node, a generator of the first data block set is a transmitter of the first data before being relayed, the generator of the first data block set is a node other than the first node, and the second ID is used to indicate a receiver of the first data block set.

In one subembodiment of the embodiment, the first information indicates data when the first data block set is relayed.

In one embodiment, when the operating action is receiving, the second ID is an IP address of a receiver of the first data block set; when the operating action is transmitting, the second ID is an IP address of a generator of the first data block set.

In one subembodiment of the embodiment, the second ID indicates a node other than the first node.

In one subembodiment of the embodiment, when the operating action is receiving, the IP address is a target-IP-address.

In one subembodiment of the embodiment, when the operating action is transmitting, the IP address is a source-IP-address.

In one embodiment, when the operating action is receiving and the first data block set is not data that needs to be relayed, the first ID is used to indicate the first node, and the first node is a receiver of the first data block set.

In one subembodiment of the embodiment, the second ID indicates the first node.

In one subembodiment of the embodiment, the first information indicates data when the first data block set needs to be relayed.

In one embodiment, when the operating action is transmitting and the first data block set is not relayed data, the first ID is used to indicate the first node, and the first node is a generator of the first data block set.

In one subembodiment of the embodiment, the second ID indicates the first node.

In one subembodiment of the embodiment, the first information indicates data when the first data block set is relayed.

In one embodiment, the second ID is a first application layer ID, and the first application layer ID is an ID related to an application layer.

In one embodiment, the second ID comprises an application ID.

In one embodiment, the second ID comprises a Prose application ID.

In one embodiment, the second ID comprises an application layer ID.

In one embodiment, the second ID comprises an application layer user ID.

In one embodiment, the second ID comprises an application layer group ID.

In one embodiment, the second ID comprises an application user ID.

In one embodiment, the second ID comprises a ProSe Application Code.

In one embodiment, the second ID comprises a Prose application layer ID.

In one embodiment, the second ID comprises a User ID.

In one embodiment, the second ID comprises a Prose user ID.

In one embodiment, the second ID comprises user info.

In one embodiment, the second ID comprises a UE ID.

In one embodiment, the second ID comprises a UE-identity.

In one embodiment, the second ID is a first group ID, the first group ID identifies a first group, and the first group comprises a receiver of the first data block set and a generator of the first data block set.

In one embodiment, a generator of the first data block set is a node other than the first node.

In one embodiment, a receiver of the first data block set is a node other than the first node.

In one embodiment, whether a generator of the first data block set is the first node is related to whether the first data block set is data that needs to be relayed.

In one embodiment, whether a receiver of the first data block set is the first node is related to whether the first data block set is data that needs to be relayed.

In one embodiment, the second ID being a first group ID is used to indicate that the first data block set is relayed data.

In one embodiment, the second ID being a first group ID is used to indicate that the first data block set is data that needs to be relayed.

In one embodiment, the first group ID is a link layer ID.

In one embodiment, the first group comprises the first node.

In one embodiment, the first group does not comprise the first node.

In one embodiment, a group ID and a non-group ID use different coding schemes or different value ranges.

In one embodiment, the second ID is a link layer ID.

In one embodiment, the second ID is a flow ID.

In one embodiment, a flow indicated by the second ID comprises a relayed flow.

In one embodiment, a flow indicated by the second ID comprises a flow that is not relayed.

In one embodiment, the first charging information only comprises an IP address other than an IP address of the first node.

In one embodiment, the first charging information is for one of receiving or transmitting.

In one embodiment, when the first data block set is data that needs to be relayed, the first charging information is generated for one of receiving or transmitting, and the first charging information only comprises an IP address other than an IP address of the first node.

In one embodiment, when the operating action is receiving and the first ID does not indicate a receiver of the first data block set, the first charging information only comprises an IP address other than an IP address of the first node.

In one embodiment, when the operating action is receiving and a destination link layer ID list maintained by a node indicated by the second ID does not comprise the first identity, the first charging information only comprises an IP address other than an IP address of the first node.

In one embodiment, when the operating action is transmitting and the first ID does not indicate a generation of the first data block set, the first charging information only comprises an IP address other than an IP address of the first node.

In one embodiment, when the operating action is receiving and a source link layer ID list maintained by a node indicated by the second ID does not comprise the first ID, the first charging information only comprises an IP address other than an IP address of the first node.

In one embodiment, the first charging information only comprises an application layer ID other than an application layer ID of the first node.

In one embodiment, when the first data block set is data that needs to be relayed, the first charging information is generated for one of receiving or transmitting, and the first charging information only comprises an application layer ID other than an application layer ID of the first node.

In one embodiment, when the operating action is receiving and the first ID does not indicate a receiver of the first data block set, the first charging information only comprises an application layer ID other than an application layer ID of the first node.

In one embodiment, when the operating action is receiving and a destination link layer ID list maintained by a node indicated by the second ID does not comprise the first ID, the first charging information only comprises an application layer ID other than an application layer ID of the first node.

In one embodiment, when the operating action is transmitting and the first ID does not indicate a generator of the first data block set, the first charging information only comprises an application layer ID other than an application layer ID of the first node.

In one embodiment, when the operating action is transmitting and a source link layer ID list maintained by a node indicated by the second ID does not comprise the first ID, the first charging information only comprises an application layer ID other than an application layer ID of the first node.

In one embodiment, the first charging information only comprises a link layer ID other than a link layer ID of the first node.

In one embodiment, when the first data block set is data that needs to be relayed, the first charging information is generated for one of receiving or transmitting, and the first charging information only comprises a link layer ID other than a link layer ID of the first node.

In one embodiment, when the operating action is receiving and the first ID does not indicate a receiver of the first data block set, the first charging information only comprises a link layer ID other than a link layer ID of the first node.

In one embodiment, when the operating action is receiving and a destination link layer ID list maintained by a node indicated by the second ID does not comprise the first ID, the first charging information only comprises a link layer ID other than a link layer ID of the first node.

In one embodiment, when the operating action is transmitting and the first ID does not indicate a generator of the first data block set, the first charging information only comprises a link layer ID other than a link layer ID of the first node.

In one embodiment, when the operating action is transmitting and a source link layer ID list maintained by a node indicated by the second ID does not comprise the first ID, the first charging information only comprises a link layer ID other than a link layer ID of the first node.

In one embodiment, the operating action implicitly indicates forwarding or relaying.

In one embodiment, when the operating action is transmitting, the operating action indicates forwarding or relaying.

In one embodiment, the first charging information only comprises being generated after being forwarded or relayed.

In one embodiment, the first charging information only comprises that the first data block set is generated after being forwarded or relayed.

In one embodiment, the first charging information is generated only for forwarding or relaying.

In one embodiment, the first charging information is generated only for transmitting.

In one embodiment, the meaning of the transmitting behavior includes forwarding.

In one embodiment, the meaning of the transmitting behavior includes relaying.

Embodiment 2

Figure 2:
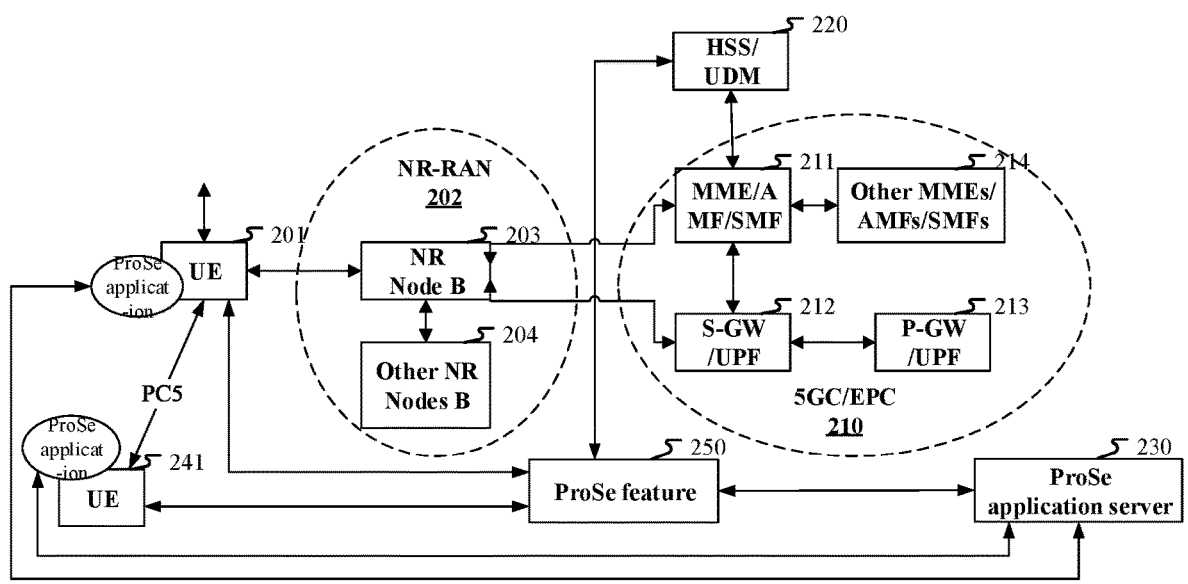
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE 241 in communication with UE 201, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS). The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 and the UE 241 are connected via a PC5 Reference Point.

In one embodiment, the ProSe feature 250 is connected with the UE 201 and the UE 241 respectively via a PC3 Reference Point.

In one embodiment, the ProSe feature 250 is connected with the ProSe application server 230 via a PC2 Reference Point.

In one embodiment, the ProSe application server 230 is connected with the ProSe application of the UE 201 and the ProSe application of the UE 241 respectively via a PC1 Reference Point.

In one embodiment, the first node in the present disclosure is the UE 201.

In one embodiment, a wireless link between the UE 201 and the UE 241 corresponds to a sidelink in the present disclosure.

In one embodiment, the UE 201 supports relay transmission.

Embodiment 3

Figure 3:
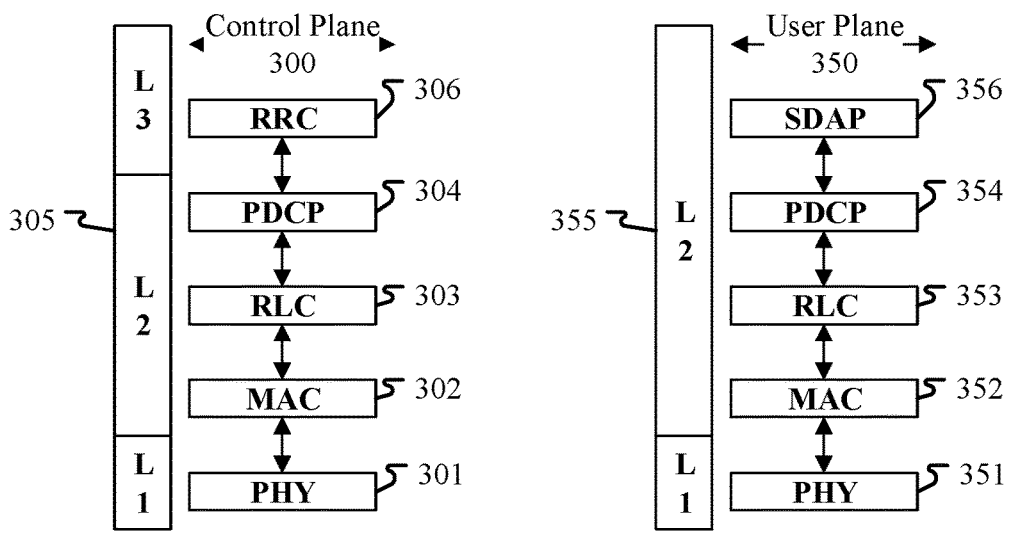
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or a satellite or an aircraft in NTN) and a second node (gNB, UE or a satellite or an aircraft in NTN), or between two UEs is represented by three layers, which are a layer 1, a layer 2 and a layer 3, respectively, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first node and a second node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node, where a signaling processed by the RRC sublayer comprises a PC5-RRC. The PC5 Signaling Protocol (PC5-S) sublayer 307 is responsible for the processing of signaling protocol at PC5 interface. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in the figure, the first node may comprise several higher layers above the L2 305. In addition, it also includes a network layer (e.g., IP layer) terminated at a P-GW of the network side and an application layer or non-access layer (NAS, Non-Access-Stratum) terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to a generator of the first data block set in the present disclosure.

In one embodiment, the radio protocol architecture in FIG. 3 is applicable to a receiver of the first data block set in the present disclosure.

In one embodiment, the first data block set in the present disclosure is generated by a layer above the PHY 301 or the MAC 302 or the RLC 303 or the PDCP 304 or PC5-S 307 or RRC 306 or PHY 351 or MAC 352 or RLC 353 or PDCP 354 or SDAP 356 or SDAP 356.

In one embodiment, the first message in the present disclosure is generated by the PC5-S 307 or the RRC 306 or the IP layer.

In one embodiment, the second message in the present disclosure is generated by the PC5-S 307 or the RRC 306 or the IP layer.

In one embodiment, the third message in the present disclosure is generated by the NAS layer.

In one embodiment, the fourth message in the present disclosure is generated by the NAS layer.

In one embodiment, the first charging feedback message in the present disclosure is generated by the NAS layer.

In one embodiment, the fifth message in the present disclosure is generated by the PC5-S layer 307 or the RRC 306.

Embodiment 4

Figure 4:
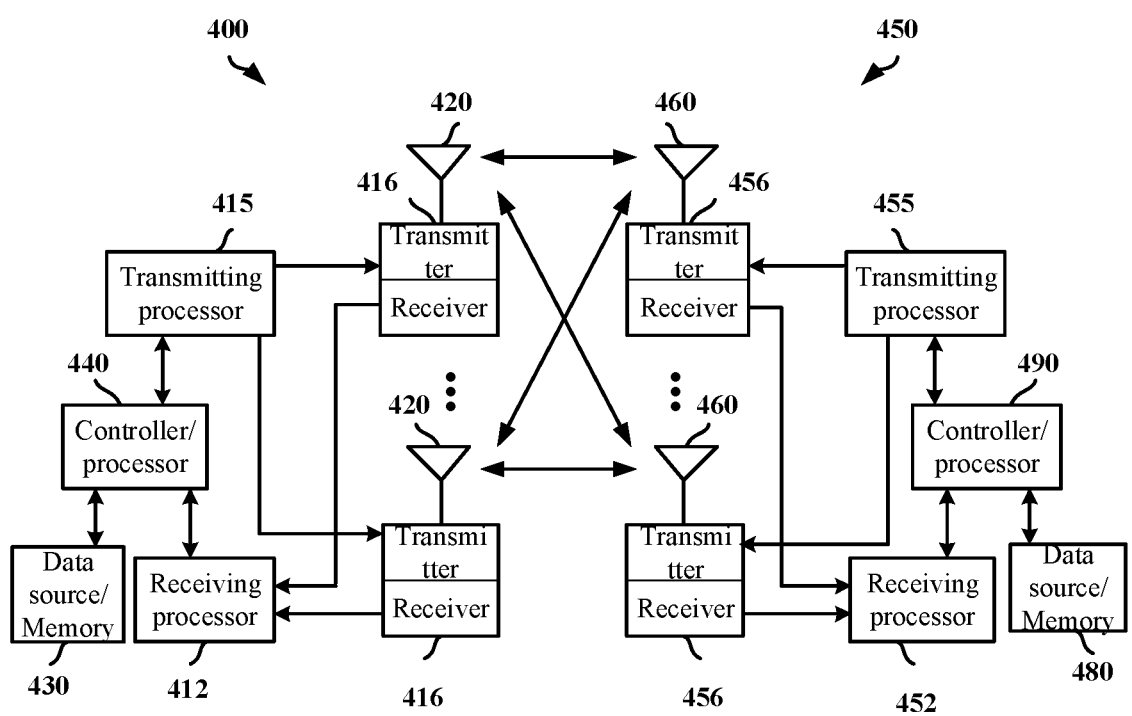
FIG. 4 illustrates a schematic diagram of a first node according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least receives a first MAC PDU, the first MAC PDU comprises a first MAC header and at least a first MAC subPDU, the first MAC header comprises at least partial bits of a first link layer ID and at least partial bits of a second link layer ID; the first MAC subPDU comprises a first MAC sub-header and a first MAC SDU, and the first MAC subPDU implicitly indicates a target link layer ID; when the target link layer ID belongs to a first ID set, transmits a second MAC PDU, the second MAC PDU comprises a second MAC header and at least a second MAC subPDU, the second MAC subPDU comprises a second MAC sub-head, the second MAC subPDU comprises at least partial bits in the first MAC SDU, and the second MAC header comprises at least partial bits in the target link layer ID; when the target link layer ID is a second link layer ID, drops a transmission of a MAC PDU comprising at least partial bits of the first MAC SDU; herein, the first ID set comprises at least one link layer ID.

In one embodiment, the first communication device 450 comprises a memory that stores a computer readable instruction program. The computer readable instruction program generates an action when executed by at least one processor. The action includes: receiving a first MAC PDU, the first MAC PDU comprising a first MAC header and at least first MAC subPDU, the first MAC header comprising at least partial bits of a first link layer ID and at least partial bits of a second link layer ID; the first MAC subPDU comprising a first MAC sub-header and a first MAC SDU, and the first MAC subPDU implicitly indicating a target link layer ID; when the target link layer ID belongs to a first ID set, transmitting a second MAC PDU, the second MAC PDU comprising a second MAC header and at least a second MAC subPDU, the second MAC subPDU comprising a second MAC sub-head, the second MAC subPDU comprising at least partial bits in the first MAC SDU, and the second MAC header comprising at least partial bits in the target link layer ID; when the target link layer ID is a second link layer ID, dropping a transmission of a MAC PDU comprising at least partial bits of the first MAC SDU; herein, the first ID set comprises at least one link layer ID.

In one embodiment, the second communication device 410 comprises at least one processor and at least one memory. The at least one memory comprises computer program codes; the at least one memory and the computer program codes are configured to be used in collaboration with the at least one processor. The second communication device 410 at least transmits a first MAC PDU, the first MAC PDU comprises a first MAC header and at least first MAC subPDU, the first MAC header comprises at least partial bits of a first link layer ID and at least partial bits of a second link layer ID; the first MAC subPDU comprises a first MAC sub-header and a first MAC SDU, and the first MAC subPDU implicitly indicates a target link layer ID; when the target link layer ID belongs to a first ID set, a receiver of the first MAC PDU transmits a second MAC PDU, the second MAC PDU comprises a second MAC header and at least a second MAC subPDU, the second MAC subPDU comprises a second MAC sub-head, the second MAC subPDU comprises at least partial bits in the first MAC SDU, and the second MAC header comprises at least partial bits in the target link layer ID; when the target link layer ID is a second link layer ID, a receiver of the first MAC PDU drops a transmission of a MAC PDU comprising at least partial bits of the first MAC SDU; herein, the first ID set comprises at least one link layer ID.

In one embodiment, the second communication device 410 comprises a memory that stores a computer readable instruction program. The computer readable instruction program generates an action when executed by at least one processor. The action includes: transmitting a first MAC PDU, the first MAC PDU comprising a first MAC header and at least first MAC subPDU, the first MAC header comprising at least partial bits of a first link layer ID and at least partial bits of a second link layer ID; the first MAC subPDU comprising a first MAC sub-header and a first MAC SDU, and the first MAC subPDU implicitly indicating a target link layer ID; when the target link layer ID belongs to a first ID set, a receiver of the first MAC PDU transmitting a second MAC PDU, the second MAC PDU comprising a second MAC header and at least a second MAC subPDU, the second MAC subPDU comprising a second MAC sub-head, the second MAC subPDU comprising at least partial bits in the first MAC SDU, and the second MAC header comprising at least partial bits in the target link layer ID; when the target link layer ID is a second link layer ID, a receiver of the first MAC PDU dropping a transmission of a MAC PDU comprising at least partial bits of the first MAC SDU; herein, the first ID set comprises at least one link layer ID.

In one embodiment, the first communication device 450 corresponds to a first node in the present disclosure.

In one embodiment, the second communication device 410 corresponds to a generator of a first data block set in the present disclosure.

In one embodiment, the second communication device 410 corresponds to a receiver of a first data block set in the present disclosure.

In one embodiment, the first communication device 450 is a UE.

In one embodiment, the first communication device 450 is a vehicle terminal.

In one embodiment, the second communication device 410 is a UE.

In one embodiment, the first communication device 410 is a vehicle terminal.

In one embodiment, the receiver 456 (including the antenna 460), the receiving processor 452 and the controller/processor 490 are used to receive the first data block set in the present disclosure.

In one embodiment, the transmitter 456 (including the antenna 460), the transmitting processor 455 and the controller/processor 490 are used to transmit the first data block set in the present disclosure.

In one embodiment, the transmitter 456 (including the antenna 460), the transmitting processor 455 and the controller/processor 490 are to transmit the fifth message in the present disclosure.

In one embodiment, the receiver 416 (including the antenna 420), the receiving processor 412 and the controller/processor 440 are used to receive the fifth message in the present disclosure.

Embodiment 5

Figure 5:
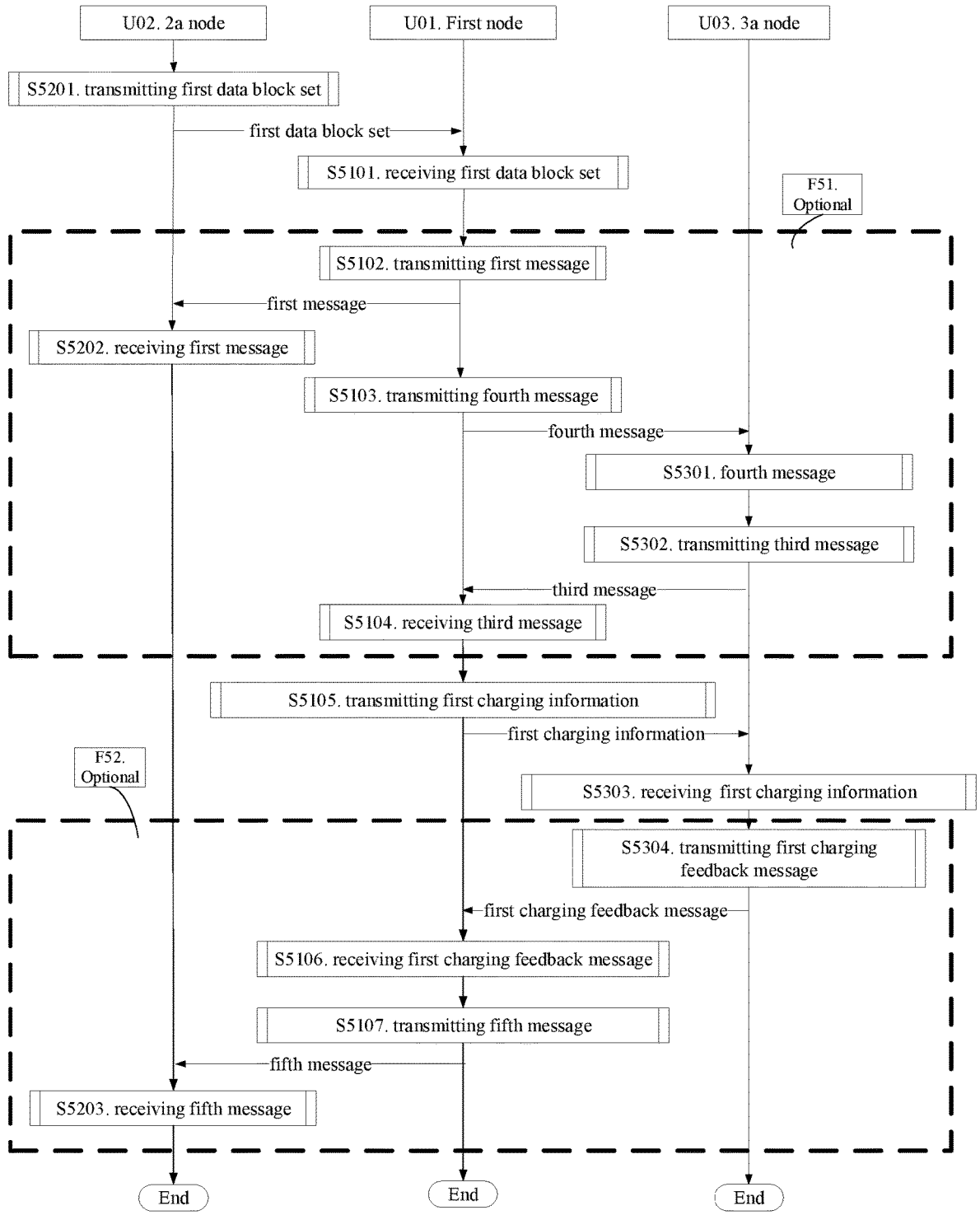
FIG. 5 illustrates a flowchart of transmission according to one embodiment of the present disclosure.

Embodiment 5 illustrates a flowchart of radio signal transmission according to one embodiment in the present disclosure, as shown in FIG. 5. In FIG. 5, the U01 corresponds to a first node in the present disclosure, a 2a node U02 is a node in communications with the first node U01, a 3a node U03 is a core network node. It is particularly underlined that the order illustrated in the embodiment does not put constraints over sequences of signal transmissions and implementations and steps in F51 and F52 are optional.

The first node U01 receives a first data block set in step S5101; transmits a first message in step S5102; transmits a fourth message in step S5103; receives a third message in step S5104; transmits first charging information in step S5105; receives a first charging feedback message in step S5106; and transmits a fifth message in step S5107.

The 2a node U02 transmits the first data block set in step S5201; receives the first message in step S5202; and receives the fifth message in step S5203.

The 3a node U03 receives the fourth message in step S5301; transmits the third message in step S5302; receives the first charging information in step S5303; and transmits the first charging feedback message in step S5304.

In Embodiment 5, a size of data in the first data block set is used to generate the first charging information, the first charging information comprises a first ID set, and the first ID set comprises a first ID and a second ID; the first ID is a link layer ID; a destination ID field of a MAC header of a MAC PDU used to carry the first data block set comprises at least partial bits in a first ID, when a destination link layer ID list maintained by a node indicated by the second ID comprises the first ID, the first ID identifies a receiver of the first data block set, and when a destination link layer ID list maintained by a node indicated by the second ID does not comprise the first ID, the first ID does not indicate a receiver of the first data block set.

In one embodiment, the first node U01 is a UE.

In one embodiment, the 2a node U02 is a UE.

In one embodiment, the 2a node U02 is a remote UE.

In one embodiment, a communication interface between the first node U01 and the 2a node U02 is a PC5.

In one embodiment, a communication interface between the first node U01 and the 2a node U02 is a Uu.

In one embodiment, the first node U01 forwards the first data block set.

In one embodiment, the first node U01 drops forwarding the first data block set.

In one subembodiment of the above embodiment, the action of dropping forwarding includes, the first node U01 is assembled with the first data block set.

In one subembodiment of the above embodiment, the action of dropping forwarding includes, handing over the first data block set to an higher layer for processing.

In one subembodiment of the above embodiment, when using layer 2 forwarding or relaying, the action of dropping forwarding includes, handing over the first data block set to a layer above layer 2 for processing.

In one subembodiment of the above embodiment, when using layer 3 forwarding or relaying, the action of dropping forwarding includes, handing over the first data block set to an application layer for processing.

In one embodiment, the forwarding action includes relaying.

In one embodiment, an SRC field of a MAC PDU header carrying the first data block set identifies the 2a node U02; a DST field of a MAC PDU header carrying the first data block set is used to identify the first node U01.

In one embodiment, an SRC field of a MAC PDU header carrying the first data block set identifies the 2a node U02; a DST field of a MAC PDU header carrying the first data block set is used to identify a node other than the first node U01.

In one embodiment, when the first node U01 drops forwarding the first data block set, a destination link layer ID list maintained by a node indicated by the second ID comprises the first ID, and the first ID identifies a receiver of the first data block set.

In one subembodiment of the above embodiment, the first ID identifies the first node U01.

In one subembodiment of the above embodiment, the second ID identifies the first node U01.

In one subembodiment of the above embodiment, a node indicated by the second ID is the first node U01.

In one embodiment, when the first node U01 forwards the first data block set, a destination link layer ID list maintained by a node indicated by the second ID does not comprise the first ID, and the first ID does not indicate a receiver of the first data block set.

In one subembodiment of the above embodiment, the first ID indicates the first node U01, and a receiver of the first data block set is a node other than the first node U01.

In one subembodiment of the embodiment, the second ID indicates a node other than the first node U01.

In one subembodiment of the embodiment, the second ID indicates a receiver of the first data block set.

In one embodiment, a receiver of the first data block set is a node drops forwarding the first data block set.

In one embodiment, the first node U01 has an IP address allocation function.

In one embodiment, when the first node U01 has an IP address allocation function, the first node U01 transmits the first message, and the first message is used to configure an IP address of the 2a node U01.

In one subembodiment of the above embodiment, the IP address is IPv6 or IPv4.

In one subembodiment of the above embodiment, the first node U01 allocates IP addresses to itself and the 2a node U02.

In one subembodiment of the above embodiment, an IP address of the first node U01 and an IP address of the 2a node U02 are at least the same in partial bits.

In one subembodiment of the above embodiment, prefix fields of an IP address of the first node U01 and an IP address of the 2a node U02 are the same.

In one subembodiment of the above embodiment, subnet fields of an IP address of the first node U01 and an IP address of the 2a node U02 are the same.

In one subembodiment of the above embodiment, global ID fields of an IP address of the first node U01 and an IP address of the 2a node U02 are the same.

In one subembodiment of the above embodiment, interface ID fields of an IP address of the first node U01 and an IP address of the 2a node U02 are the same.

In one subembodiment of the above embodiment, global routing prefix fields of an IP address of the first node U01 and an IP address of the 2a node U02 are the same.

In one subembodiment of the above embodiment, subnets of an IP address of the first node U01 and an IP address of the 2a node U02 are the same.

In one subembodiment of the above embodiment, advantages of the above method include, an IP address can indicate a plurality of nodes.

In one embodiment, when the first node U01 does not have an IP address allocation function, the first node U01 receives the second message, and the second message is used to indicate an IP address of the 2a node U02.

In one subembodiment of the above embodiment, the IP address is IPv6 or IPv4.

In one subembodiment of the above embodiment, the first node only allocates an IP address to itself.

In one subembodiment of the above embodiment, an IP address allocated to the first node U01 itself and an IP address of the 2a node U02 are at least the same in partial bits.

In one subembodiment of the above embodiment, subnets of an IP address of the first node U01 and an IP address of the 2a node U02 are the same.

In one subembodiment of the above embodiment, prefix fields of an IP address of the first node U01 and an IP address of the 2a node U02 are the same.

In one subembodiment of the above embodiment, subnet fields of an IP address of the first node U01 and an IP address of the 2a node U02 are the same.

In one subembodiment of the above embodiment, global ID fields of an IP address of the first node U01 and an IP address of the 2a node U02 are the same.

In one subembodiment of the above embodiment, interface ID fields of an IP address of the first node U01 and an IP address of the 2a node U02 are the same.

In one subembodiment of the above embodiment, global routing prefix fields of an IP address of the first node U01 and an IP address of the 2a node U02 are the same.

In one subembodiment of the above embodiment, advantages of the above method include, an IP address can indicate a plurality of nodes.

In one embodiment, the 3a node U03 comprises a Proximity-services (Prose) Function.

In one embodiment, the 3a node U03 comprises a Mobility Management Entity (MME).

In one embodiment, the 3a node U03 comprises a Home Subscriber Server (HSS).

In one embodiment, the 3a node U03 comprises a Gateway (GW).

In one embodiment, the 3a node U03 comprises a server related to V2X.

In one embodiment, the 3a node U03 comprises an Application Function (AF).

In one embodiment, the 3a node U03 comprises a User Plane Function (UPF).

In one embodiment, the 3a node U03 comprises an Access and Mobility Management Function (AMF).

In one embodiment, the 3a node U03 comprises a Session Management Function (SMF).

In one embodiment, the 3a node U03 comprises a Network Exposure Function (NEF).

In one embodiment, the 3a node U03 comprises a Policy Control Function (PCF).

In one embodiment, the fourth message comprises at least one ID in the first ID set.

In one subembodiment of the above embodiment, the fourth message comprises the first ID.

In one subembodiment of the above embodiment, the fourth message comprises the second ID.

In one subembodiment of the above embodiment, a transmission of the fourth message is triggered by updating a layer 2 ID.

In one subembodiment of the above embodiment, a transmission of the fourth message is triggered by updating an application layer ID.

In one subembodiment of the above embodiment, a transmission of the fourth message is triggered by establishing a connection.

In one subembodiment of the above embodiment, a transmission of the fourth message is triggered by an IP address allocation or update.

In one subembodiment of the above embodiment, a transmission of the fourth message is triggered by establishing or updating a group.

In one subembodiment of the above embodiment, the fourth message indicates a node identified by the first ID.

In one subembodiment of the above embodiment, the fourth message indicates a node identified by the second ID.

In one embodiment, the third message is used to configure the first charging information, the third message is used to indicate a first collection period, the first data block set is operated within the first collection period, and the first charging information is generated for the first collection period.

In one embodiment, the third message indicates a collection period, and the first collection period is a collection period.

In one subembodiment of the embodiment, each collection period is orthogonal in time domain.

In one subembodiment of the embodiment, each collection period comprises a start time and a duration time.

In one embodiment, the first node U01 generates charging information for each collection period.

In one subembodiment of the embodiment, the first node U01 generates the first charging information for the first collection period.

In one embodiment, the first data block set is received in the first collection period.

In one embodiment, the third message indicates whether the first charging information is generated for transmission or reception.

In one embodiment, the third message indicates a type of an ID comprised in the first charging information.

In one embodiment, the third message indicates a format or version of the first charging information.

In one embodiment, when the first charging information is generated, the first node immediately transmits the first charging information.

In one embodiment, after the first charging information is generated, the first node U01 transmits the first charging information in a time window.

In one subembodiment of the above embodiment, the time window is configured by the third message.

In one embodiment, the first feedback message is used to feed back the first charging information.

In one embodiment, the first charging feedback message indicates received charging information.

In one embodiment, the first charging feedback message indicates a collection period corresponding to received charging information.

In one embodiment, the first charging feedback message indicates a collection period during which charging information is not received.

In one embodiment, the first charging feedback message indicates that charging information that is not received is used to trigger the first node U01 to retransmit charging information.

In one embodiment, the first message comprises a PC5-S message.

In one embodiment, the first message comprises a PC5-RRC message.

In one embodiment, the first message comprises an IP message.

In one embodiment, the fourth message and the third message are both NAX messages.

In one embodiment, the first node U01 transmits a usage information report message, the usage information report message is an NAS message, and the usage information report message comprises the first charging information.

In one embodiment, the first charging feedback message is an NAS message.

In one embodiment, the fifth message comprises a PC5-S message.

In one embodiment, the fifth message comprises a PC5-RRC message.

Embodiment 6

Figure 6:
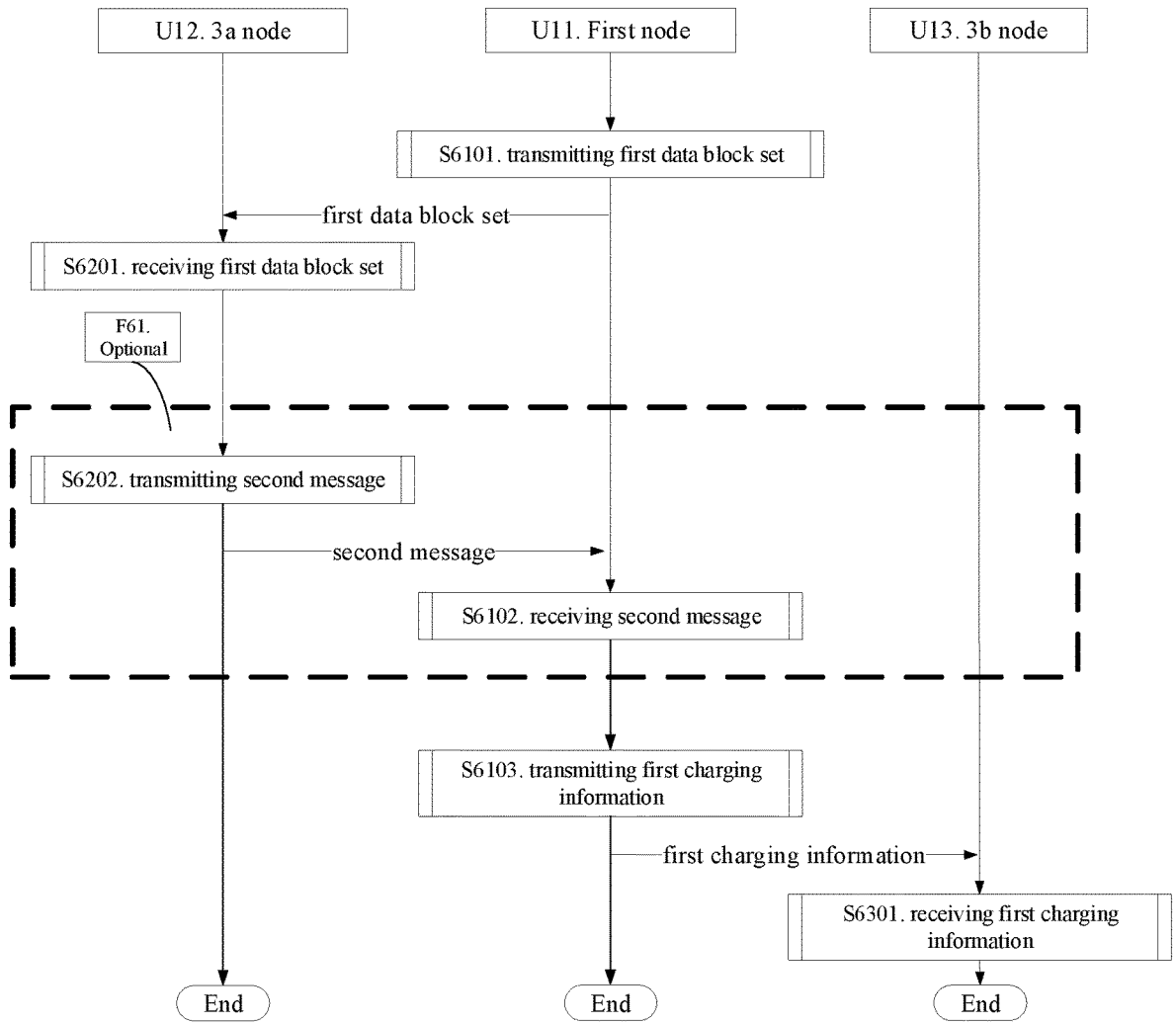
FIG. 6 illustrates a flowchart of transmission according to one embodiment of the present disclosure.

Embodiment 6 illustrates a flowchart of radio signal transmission according to one embodiment of the present disclosure, as shown in FIG. 6. In FIG. 6, the U11 corresponds to a first node in the present disclosure, the 3a node U12 is a node that is in communications with the first node U11, a 3b node U13 is a core network node. It is particularly underlined that the order illustrated in the embodiment does not put constraints over sequences of signal transmissions and implementations. Embodiment 6 is based on Embodiment 5, and the parts needed but not shown in Embodiment 6 can be seen in Embodiment 5, where steps in F61 are optional.

The first node U11 transmits a first data block set in step S6101; receives a second message in step S6102; and transmits first charging information in step S6103;

the 3a node U12 receives the first data block set in step S6201; and transmits the second message in step S6202;

the 3b node U13 receives the first charging information in step S6301.

In Embodiment 6, a size of data in the first data block set is used to generate the first charging information, the first charging information comprises a first ID set, and the first ID set comprises a first ID and a second ID; the first ID is a link layer ID; a source ID field of a MAC header of a MAC PDU used to carry the first data block set comprises at least partial bits in a first ID, when a source link layer ID list maintained by a node indicated by the second ID comprises the first ID, the first ID indicates a generator of the first data block set, and when a source link layer ID list maintained by a node indicated by the second ID does not comprise the first ID, the first ID does not indicate a generator of the first data block set.

In one embodiment, the first node U11 is a UE.

In one embodiment, the 3a node U12 is a UE.

In one embodiment, the 3a node U12 is a remote UE.

In one embodiment, the first data block set is transmitted via a PC5 interface.

In one embodiment, the first data block set is transmitted via a sidelink.

In one embodiment, the first data block set occupies an STCH and an SCCH.

In one embodiment, a physical channel occupied by the first data block set comprises a PSSCH.

In one embodiment, the first node U11 generates and transmits a MAC PDU set to carry the first data block set.

In one embodiment, the first data block set is transmitted within the first collection period.

In one embodiment, a source ID field of a MAC header of a MAC PDU used to carry the first data block set comprises at least partial bits in a first ID.

In one subembodiment of the above embodiment, a source ID field of a MAC header of a MAC PDU used to carry the first data block set comprises 8 most significant bits in a first ID.

In one subembodiment of the above embodiment, a source ID field of a MAC header of a MAC PDU used to carry the first data block set comprises 16 most significant bits in a first ID.

In one embodiment, the first ID comprises 24 bits.

In one embodiment, the first data block set is forwarded by the first node U11.

In one embodiment, the first data block set is not forwarded by the first node U11.

In one subembodiment of the above embodiment, the action of not being forwarded by the first node U11 includes, the first node U11 generates the first data block set.

In one subembodiment of the above embodiment, the action of not being forwarded by the first node U11 includes, the first data block set is generated by a higher layer of the first node.

In one subembodiment of the above embodiment, when using layer 2 forwarding or relaying, the action of not being forwarded by the first node U11 includes, the first data block set is generated by a layer above the layer 2 of the first node U11.

In one subembodiment of the above embodiment, when using layer 3 forwarding or relaying, the action of not being forwarded by the first node U11 includes, the first data block set is generated by an application layer of the first node U11.

In one embodiment, the forwarding action includes relaying.

In one embodiment, an SRC field of a MAC PDU header carrying the first data block set identifies the first node U11; a DST field of a MAC PDU header carrying the first data block set is used to identify the 3a node U12.

In one embodiment, when the first data block set is not forwarded by the first node U11, a source link layer ID list maintained by a node indicated by the second ID comprises the first ID, and the first ID identifies a generator of the first data block set.

In one subembodiment of the above embodiment, the first ID identifies the first node U11.

In one subembodiment of the above embodiment, the second ID identifies the first node U11.

In one subembodiment of the above embodiment, a node indicated by the second ID is the first node U11.

In one embodiment, when the first node U11 forwards the first data block set, a source link layer ID list maintained by a node indicated by the second ID does not comprise the first ID, and the first ID does not indicate a generator of the first data block set.

In one subembodiment of the above embodiment, the first ID indicates the first node U11, and a generator of the first data block set is a node other than the first node U11.

In one subembodiment of the embodiment, the second ID indicates a node other than the first node U11.

In one subembodiment of the embodiment, the second ID indicates a generator of the first data block set.

In one embodiment, a generator of the first data block set is a node generating the first data block set.

In one embodiment, the first node U11 does not have an IP address allocation function, the first node U11 receives the second message, and the second message is used to indicate an IP address of the 3a node U12.

In one subembodiment of the above embodiment, the IP address is IPv6 or IPv4.

In one subembodiment of the above embodiment, the first node only allocates an IP address to itself.

In one subembodiment of the above embodiment, an IP address allocated to the first node U11 itself and an IP address of the 3a node U12 are at least the same in partial bits.

In one subembodiment of the above embodiment, subnets of an IP address of the first node U11 and an IP address of the 3a node U12 are the same.

In one subembodiment of the above embodiment, prefix fields of an IP address of the first node U11 and an IP address of the 3a node U12 are the same.

In one subembodiment of the above embodiment, subnet fields of an IP address of the first node U11 and an IP address of the 3a node U12 are the same.

In one subembodiment of the above embodiment, global ID fields of an IP address of the first node U11 and an IP address of the 3a node U12 are the same.

In one subembodiment of the above embodiment, interface ID fields of an IP address of the first node U11 and an IP address of the 3a node U12 are the same.

In one subembodiment of the above embodiment, global routing prefix fields of an IP address of the first node U11 and an IP address of the 3a node U12 are the same.

In one subembodiment of the above embodiment, advantages of the above method include, an IP address can indicate a plurality of nodes.

In one embodiment, the 3b node U13 comprises a Prose Function.

In one embodiment, the 3b node U13 includes MME.

In one embodiment, the 3b node U13 comprises an HSS.

In one embodiment, the 3b node U13 comprises a GW.

In one embodiment, the 3b node U13 comprises a server related to V2X.

In one embodiment, the 3b node U13 comprises an AF.

In one embodiment, the 3b node U13 comprises a UPF.

In one embodiment, the 3b node U13 comprises an AMF.

In one embodiment, the 3b node U13 comprises an SMF.

In one embodiment, the 3b node U13 comprises an NEF.

In one embodiment, the 3b node U13 comprises a PCF.

In one embodiment, the first charging information is used for generating a charging report.

Embodiment 7

Figure 7:
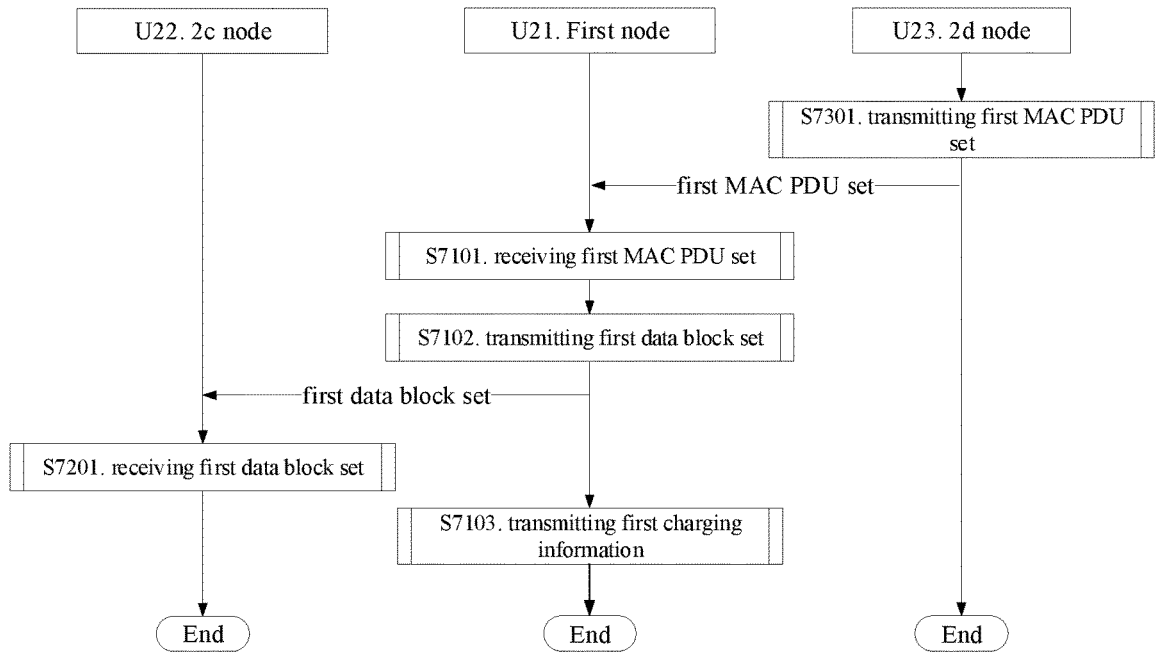
FIG. 7 illustrates a flowchart of transmission according to one embodiment of the present disclosure.

Embodiment 7 illustrates a flowchart of radio signal transmission according to one embodiment of the present disclosure, as shown in FIG. 7. In FIG. 7, the U21 corresponds to a first node in the present disclosure, a 2c node U22 is a node in communications with the first node U21, a 2d node U23 is a node in communications with the first node U21. It is particularly underlined that the order illustrated in the embodiment does not put constraints over sequences of signal transmissions and implementations. Embodiment 7 is based on Embodiment 5 and Embodiment 6, and the parts needed but not shown in Embodiment 7 can be seen in Embodiment 5 and Embodiment 6.

The first node U21 receives a first MAC PDU set in step S7101; transmits a first data block set in step S7102; and transmits first charging information in step S7103;

the 2c node U22 receives the first data block set in step S7201;

the 2d node U23 transmits the first MAC PDU set in step S7301.

In Embodiment 7, a size of data in the first data block set is used to generate the first charging information, the first charging information comprises a first ID set, and the first ID set comprises a first ID and a second ID; the first ID is a link layer ID; when a source link layer ID list maintained by a node indicated by the second ID comprises the first ID, the first ID indicates a generator of the first data block set, and when a source link layer ID list maintained by a node indicated by the second ID does not comprise the first ID, the first ID does not indicate a generator of the first data block set.

In one embodiment, the first MAC PDU set at least comprises one MAC PDU.

In one embodiment, the first MAC PDU set is transmitted via a PC5 interface.

In one embodiment, the first MAC PDU set is transmitted via a Uu interface.

In one embodiment, a physical channel occupied by the first MAC PDU set comprises a PSSCH.

In one embodiment, a logical channel occupied by the first MAC PDU set comprises an SCCH.

In one embodiment, a logical channel occupied by the first MAC PDU set comprises an STCH.

In one embodiment, a physical channel occupied by the first MAC PDU set comprises a PDSCH.

In one embodiment, a physical channel occupied by the first MAC PDU set comprises a PUSCH.

In one embodiment, the first MAC PDU set bears the first data block set.

In one embodiment, the first MAC PDU set carries the first data block set.

In one embodiment, the first MAC PDU set is transmitted within the first collection period.

In one embodiment, a MAC SDU of a MAC PDU in the first MAC PDU set carries the first data block set.

In one embodiment, a generator of the first data block set is the 2d node U23.

In one embodiment, the first charging information is generated for data transmission.

In one embodiment, the first charging information is generated for data of the first data block set being transmitted.

In one embodiment, the first charging information is generated for the first data block set being forwarded or relayed.

In one embodiment, the first data block set is encapsulated in a MAC PDU set and forwarded to the 2c node U22.

In one embodiment, a source ID field of a MAC header of a MAC PDU used to carry the first data block set is an SRC field.

In one embodiment, the first ID is an ID of the first node U21.

In one embodiment, the first ID indicates the first node U21.

In one embodiment, the second ID is used to indicate the 2d node U23.

In one embodiment, the second ID is an IP address, and the first charging information does not comprise an IP address of the first node U21.

In one embodiment, the second ID is an application layer ID, and the first charging information does not comprise an application layer ID of the first node U21.

In one embodiment, the first charging information comprises two source identities, one of which is the first ID, and the other is the second ID.

In one embodiment, the MAC PDU carrying the first data block set is a MAC PDU in the first MAC PDU set, and the first ID is used to indicate the 2d node U23.

In one subembodiment of the above embodiment, the second ID is used to indicate the 2d node U23.

In one subembodiment of the above embodiment, the 2d node U23 is a generator of the first data block.

In one subembodiment of the above embodiment, a source link layer ID maintained by a node indicated by the second ID comprises the first ID.

In one subembodiment of the above embodiment, the second ID indicates the 2d node U23.

In one subembodiment of the above embodiment, the first charging information comprises an ID used to indicate the 2c node U22.

In one embodiment, the first ID indicates the first node U21, the second ID indicates the 2d node U23, the first charging information comprises a third ID, and the third ID indicates the 2c node U22.

Embodiment 8

Figure 8:
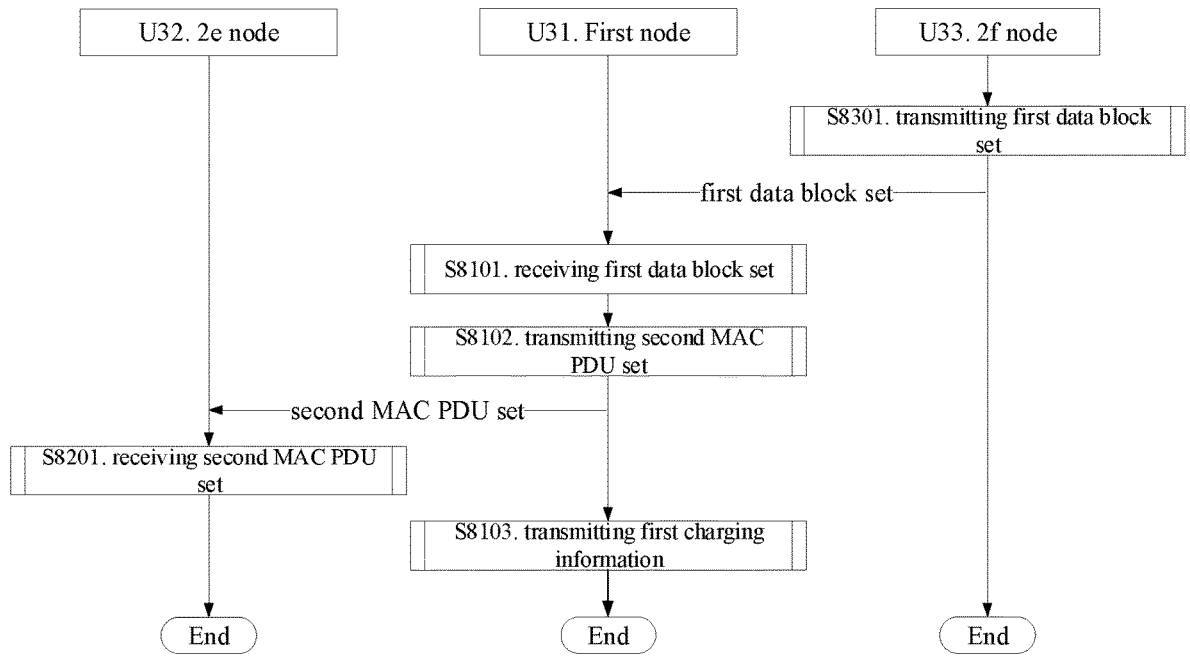
FIG. 8 illustrates a flowchart of transmission according to one embodiment of the present disclosure.

Embodiment 8 illustrates a flowchart of radio signal transmission according to one embodiment in the present disclosure, as shown in FIG. 8. In FIG. 8, the U31 corresponds to a first node in the present disclosure, a 2e node U32 is a node in communications with the first node U31, a 2f node U33 is a node in communications with the first node U31. It is particularly underlined that the order illustrated in the embodiment does not put constraints over sequences of signal transmissions and implementations. Embodiment 8 is based on Embodiment 5 and Embodiment 6, and the parts needed but not shown in Embodiment 8 can be seen in Embodiment 5 and Embodiment 6.

The first node U31 receives a first data block set in step S8101; transmits a second MAC PDU in step S8102; and transmits first charging information in step S8103;
the 2e node U32 receives the second MAC PDU set in step S8201;
the 2f node U33 transmits the first data block set in step S8301.

In Embodiment 8, a size of data in the first data block set is used to generate the first charging information, the first charging information comprises a first ID set, and the first ID set comprises a first ID and a second ID; the first ID is a link layer ID; a destination ID field of a MAC header of a MAC PDU used to carry the first data block set comprises at least partial bits in a first ID, when a destination link layer ID list maintained by a node indicated by the second ID comprises the first ID, the first ID identifies a receiver of the first data block set, and when a destination link layer ID list maintained by a node indicated by the second ID does not comprise the first ID, the first ID does not indicate a receiver of the first data block set.

In one embodiment, the second MAC PDU set at least comprises one MAC PDU.

In one embodiment, the second MAC PDU set is transmitted via a PC5 interface.

In one embodiment, the second MAC PDU set is transmitted via a Uu interface.

In one embodiment, a physical channel occupied by the second MAC PDU set comprises a PSSCH.

In one embodiment, a logical channel occupied by the second MAC PDU set comprises an SCCH.

In one embodiment, a logical channel occupied by the second MAC PDU set comprises an STCH.

In one embodiment, a physical channel occupied by the second MAC PDU set comprises a PDSCH.

In one embodiment, a physical channel occupied by the second MAC PDU set comprises a PUSCH.

In one embodiment, the second MAC PDU set bears the first data block set.

In one embodiment, the second MAC PDU set carries the first data block set.

In one embodiment, the second MAC PDU set is transmitted within the first collection period.

In one embodiment, a MAC SDU of a MAC PDU in the second MAC PDU set carries the first data block set.

In one embodiment, a generator of the first data block set is the 2f node U33.

In one embodiment, the first charging information is generated for data being received.

In one embodiment, the first charging information is generated for data of the first data block set being received.

In one embodiment, the first charging information is generated for the first data block set being forwarded or relayed.

In one embodiment, the first data block set is encapsulated in the second MAC PDU set and forwarded to the 2e node U32.

In one embodiment, a destination ID field of a MAC header of a MAC PDU used to carry the first data block set is a DST field.

In one embodiment, the first ID is an ID of the first node U31.

In one embodiment, the first ID indicates the first node U31.

In one embodiment, the second ID is used to indicate the 2e node U32.

In one embodiment, the second ID is an IP address, and the first charging information does not comprise an IP address of the first node U31.

In one embodiment, the second ID is an application layer ID, and the first charging information does not comprise an application layer ID of the first node U31.

In one embodiment, the first charging information comprises two destination identities, one of which is the first ID, and the other is the second ID.

In one embodiment, the MAC PDU carrying the first data block set is a MAC PDU in the second MAC PDU set, and the first ID is used to indicate the 2e node U32.

In one subembodiment of the above embodiment, the second ID is used to indicate the 2e node U32.

In one subembodiment of the above embodiment, the first charging information comprises an ID used to indicate the 2f node U33.

In one embodiment, the first ID indicates the first node U31, the second ID indicates the 2e node U32, the first charging information comprises a fourth ID, and the fourth ID indicates the 2f node U33.

Embodiment 9

Figure 9:
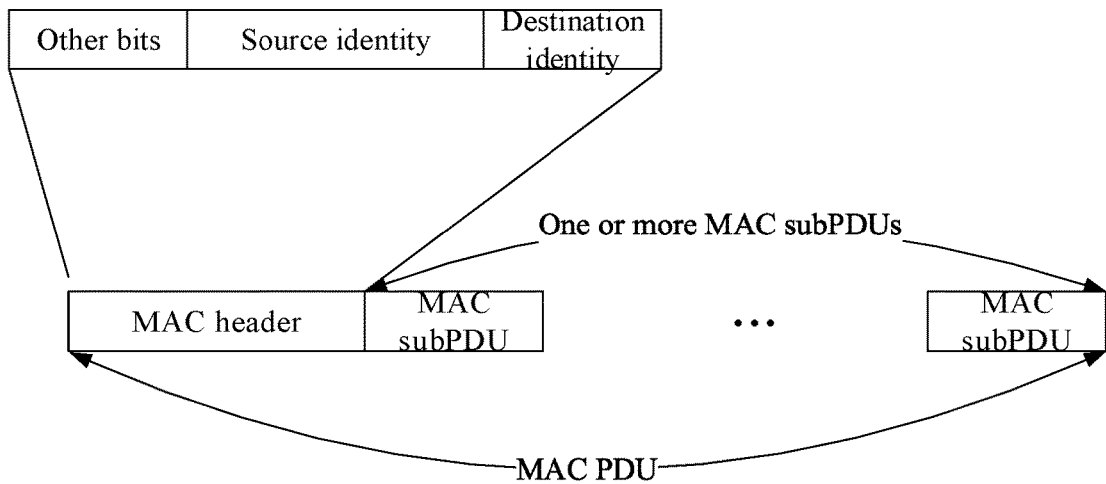
FIG. 9 illustrates a schematic diagram of a MAC PDU according to one embodiment of the present disclosure.

Embodiment 9 illustrates a schematic diagram of a MAC PDU according to one aspect of the present disclosure, as shown in FIG. 9.

In Embodiment 9, a MAC PDU comprises a MAC header and at least one MAC subPDU; and the MAC header comprises a source ID, a destination ID and other bits.

In one embodiment, the MAC PDU is transmitted on a SideLink Shared CHannel (SL-SCH).

In one embodiment, a number of bits comprised in the MAC header is fixed.

In one embodiment, a number of bits comprised in the MAC header is 32.

In one embodiment, the MAC header is an SL-SCH MAC subheader.

In one embodiment, the MAC header is an SL-SCH subheader.

In one embodiment, the other bits comprise 5 fields, V, R, R, R, and R, and numbers of bits comprised are 4, 1, 1, 1 and 1 respectively.

In one embodiment, the source ID and the destination ID respectively comprise 16 bits and 8 bits.

In one embodiment, the source ID in the MAC header and the destination ID in the MAC header are respectively an SRC field and a DST field.

In one embodiment, each MAC subPDU comprises a MAC subheader and a MAC SDU, a MAC subheader in each MAC subPDU comprises a Logical Channel IDentifier (LCID) field, and the LCID field indicates a channel ID of a logical channel corresponding to a MAC SDU.

In one embodiment, the LCID field comprises 5 bits.

In one embodiment, the LCID field comprises 6 bits.

In one embodiment, each MAC PDU is also allowed to comprise a padding bit.

In one embodiment, a MAC subPDU comprises an RLC PDU.

In one embodiment, a MAC subPDU comprises a MAC CE.

In one embodiment, the MAC PDU in FIG. 9 carries the first data block set.

In one embodiment, the MAC PDU in FIG. 9 is a MAC PDU in a first MAC PDU set in Embodiment 1 in the present disclosure.

In one embodiment, the MAC PDU in FIG. 9 is a MAC PDU in a second MAC PDU set in Embodiment 1 in the present disclosure.

In one embodiment, the MAC PDU in FIG. 9 is a MAC PDU in a first MAC PDU set in Embodiment 7 in the present disclosure.

In one embodiment, the MAC PDU in FIG. 9 is a MAC PDU in a second MAC PDU set in Embodiment 8 in the present disclosure.

Embodiment 10

Figure 10:
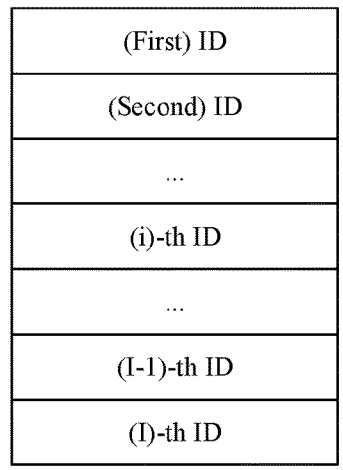
FIG. 10 illustrates a schematic diagram of a link layer ID list maintained by a node indicated by a second ID according to one embodiment of the present disclosure.

Embodiment 10 illustrates a schematic diagram of a link layer ID list maintained by a node indicated by a second ID according to one embodiment of the present disclosure, as shown in FIG. 10.

In one embodiment, the link layer ID list maintained by a node indicated by the second ID is a source ID list.

In one embodiment, the link layer ID list maintained by a node indicated by the second ID is a destination ID list.

In one embodiment, the link layer ID list maintained by a node indicated by the second ID illustrated in FIG. 10 comprises I link layer ID(s), I being a positive integer.

In one embodiment, the phrase of "a destination link layer ID list maintained by a node indicated by the second ID" includes a destination link layer ID list of a node indicated by the second ID.

In one embodiment, the phrase of "a destination link layer ID list maintained by a node indicated by the second ID" includes a destination link layer ID list owned by a node indicated by the second ID.

In one embodiment, the phrase of "a destination link layer ID list maintained by a node indicated by the second ID" includes that the ID list is a data structure comprising at least one ID.

In one embodiment, the phrase of "a destination link layer ID list maintained by a node indicated by the second ID" includes that the ID list is a table comprising at least one ID.

In one embodiment, the phrase of "a destination link layer ID list maintained by a node indicated by the second ID" includes that the ID list is a list comprising at least one ID.

In one embodiment, the phrase of "a destination link layer ID list maintained by a node indicated by the second ID" includes that the ID list is a set comprising at least one ID.

In one embodiment, the phrase of "a destination link layer ID list maintained by a node indicated by the second ID" includes that the ID list is a group comprising at least one ID.

In one embodiment, the phrase of "a destination link layer ID list maintained by a node indicated by the second ID" includes all destination link layer IDs of a node indicated by the second ID.

In one embodiment, the phrase of "a destination link layer ID list maintained by a node indicated by the second ID" includes a destination link layer ID of a node indicated by the second ID.

In one embodiment, the phrase of "a destination link layer ID list maintained by a node indicated by the second ID" includes all destination link layer IDs of a node indicated by the second ID.

In one embodiment, the phrase of "a destination link layer ID list maintained by a node indicated by the second ID" includes that when a destination ID indicated by a received DST field of a MAC PDU header belongs to the destination link layer ID list, the MAC PDU is processed.

In one embodiment, the phrase of "a destination link layer ID list maintained by a node indicated by the second ID" includes that when a destination ID indicated by a received DST field of a MAC PDU header belongs to the destination link layer ID list, the MAC PDU is forwarded or handed over to a higher layer for processing.

In one embodiment, the phrase of "a destination link layer ID list maintained by a node indicated by the second ID" includes that when a destination ID indicated by a received DST field of a MAC PDU header does not belong to the destination link layer ID list, the MAC PDU is dropped.

In one embodiment, the phrase of "a source link layer ID list maintained by a node indicated by the second ID" includes a source link layer ID list of a node indicated by the second ID.

In one embodiment, the phrase of "a source link layer ID list maintained by a node indicated by the second ID" includes a source link layer ID list owned by a node indicated by the second ID.

In one embodiment, the phrase of "a source link layer ID list maintained by a node indicated by the second ID" includes that the ID list is a data structure comprising at least one ID.

In one embodiment, the phrase of "a source link layer ID list maintained by a node indicated by the second ID" includes that the ID list is a table comprising at least one ID.

In one embodiment, the phrase of "a source link layer ID list maintained by a node indicated by the second ID" includes that the ID list is a list comprising at least one ID.

In one embodiment, the phrase of "a source link layer ID list maintained by a node indicated by the second ID" includes that the ID list is a set comprising at least one ID.

In one embodiment, the phrase of "a source link layer ID list maintained by a node indicated by the second ID" includes that the ID list is a group comprising at least one ID.

In one embodiment, the phrase of "a source link layer ID list maintained by a node indicated by the second ID" includes all source link layer IDs of a node indicated by the second ID.

In one embodiment, the phrase of "a source link layer ID list maintained by a node indicated by the second ID" includes at least one source link layer ID of a node indicated by the second ID.

In one embodiment, the phrase of "a source link layer ID list maintained by a node indicated by the second ID" includes a source link layer ID of a node indicated by the second ID.

In one embodiment, the phrase of "a source link layer ID list maintained by a node indicated by the second ID" includes that a source ID indicated by an SRC field of a MAC PDU header received by a relay node is used to indicate a generator of the MAC PDU.

Embodiment 11

Figure 11:
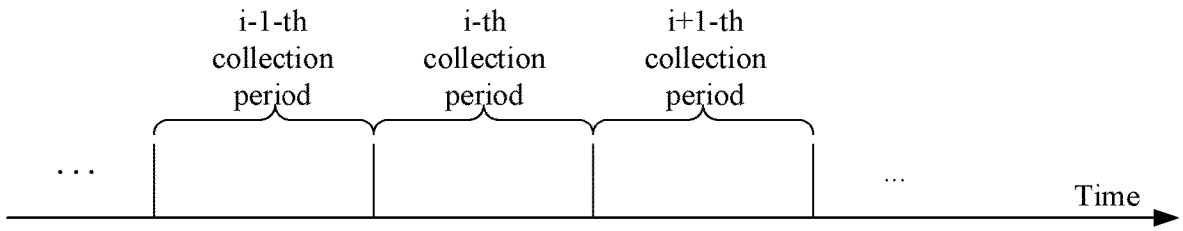
FIG. 11 illustrates a schematic diagram of a collection period according to one embodiment of the present disclosure.

Embodiment 11 illustrates a schematic diagram of a collection period according to one embodiment of the present disclosure, as shown in FIG. 11.

In one embodiment, the third message indicates a collection period.

In one embodiment, a time length of each collection period is the same.

In one embodiment, the first collection period is one of all collection periods.

In one embodiment, the third message indicates a time length of a collection period.

In one embodiment, the collection period is measured by s.

In one embodiment, the collection period is measured by ms.

In one embodiment, the collection period is measured by subframe.

In one embodiment, the collection period is measured by superframe.

In one embodiment, the third message is used to indicate a start time and an end time of a collection period.

In one embodiment, the third message explicitly indicates a time length of the collection period; the third message does not indicate a start time of the collection period, and a receiver of the third message determines a start time of the collection period.

In one embodiment, the first node counts a size of data operated within the first collection period.

Embodiment 12

Figure 12:
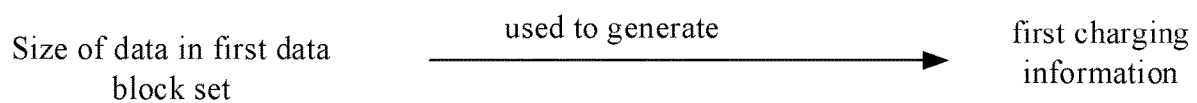
FIG. 12 illustrates a schematic diagram of a size of data in a first data block set being used to generate first charging information according to one embodiment of the present disclosure.

Embodiment 12 illustrates a schematic diagram of a size of data in a first data block set being used to generate first charging information according to one embodiment of the present disclosure, as shown in FIG. 12.

In one embodiment, the first node receives a third message, and the third message is used to configure the first charging information.

In one embodiment, the third message is used to indicate the first collection period.

In one embodiment, the first data block set is operated within the first collection period.

In one embodiment, when the operating action is receiving, a size of data in the first data block set is used to generate the first charging information for receiving.

In one embodiment, when the operating action is transmitting, a size of data in the first data block set is used to generate the first charging information for transmitting.

In one embodiment, a size of data of the first data block set comprises a number of data blocks.

In one embodiment, a size of data of the first data block set comprises a number of bits of a data block.

In one embodiment, a size of data of the first data block set comprises a number of Mbits of a data block.

In one embodiment, a size of data of the first data block set comprises a number of Gbits of a data block.

In one embodiment, a size of data of the first data block set comprises a number of Tbits of a data block.

In one embodiment, a size of data of the first data block set comprises a number of Bytes of a data block.

In one embodiment, a size of data of the first data block set comprises a number of MBs of a data block.

In one embodiment, a size of data of the first data block set comprises a number of GBs of a data block.

In one embodiment, a size of data of the first data block set comprises a number of TBs of a data block.

In one embodiment, a size of data of the first data block set comprises a number of resources occupied by a data block.

In one embodiment, a number of the first data block sets comprises a number of IP packets and a number of non-IP packets.

In one embodiment, the first data block set comprises P data block(s), and a number P of the P data block(s) is recorded by the first charging information.

In one embodiment, the first data block set comprises KN bit(s), where KN is a positive integer, and KN is recorded by the first charging information.

In one embodiment, the first data block set comprises KN bit(s), where KN is a positive integer, and a quantized value of KN is recorded by the first charging information.

In one subembodiment of the above embodiment, the third message configures the quantization.

In one embodiment, the first data block set comprises KN bit(s), where KN is a positive integer, and a larger one between KN and a fixed number is recorded by the first charging information.

In one embodiment, the first data block set comprises KN bit(s), where KN is a positive integer, and a smaller one between KN and a fixed number is recorded by the first charging information.

In one embodiment, the first charging information comprises a value of a product of a size of data in the first data block set and a fixed number.

In one embodiment, the fixed number comprises a real number.

In one embodiment, the fixed number/static value is configured by the third message.

In one embodiment, a size of data of the first data block set and a first collection period are used together to determine an average data rate, and the first charging information comprises the average data rate.

In one embodiment, a result obtained after a size of data of the first data block set is processed by a filter is comprised in the first charging information, where the filter is configured by the network.

Embodiment 13

Figure 13:
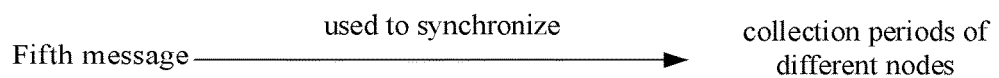
FIG. 13 illustrates a schematic diagram of a fifth message being used to synchronize collection periods of different nodes according to one embodiment of the present disclosure.

Embodiment 13 illustrates a schematic diagram of a fifth message being used to synchronize collection periods of different nodes according to one embodiment of the present disclosure, as shown in FIG. 13.

In one embodiment, the fifth message is used to synchronize the first collection period and a second collection period, the first node receives the first data block set, and a transmitter of the first data block set generates charging information for the second collection period.

In one subembodiment of the above embodiment, the first collection period is a current collection period of the first node.

In one subembodiment of the above embodiment, the second collection period is a current collection period of a transmitter of the first data block set.

In one embodiment, the fifth message is used to synchronize the first collection period and a third collection period, the first node transmits the first data block set, and a receiver of the first data block set generates charging information for the third collection period.

In one subembodiment of the above embodiment, the first collection period is a current collection period of the first node.

In one subembodiment of the above embodiment, the third collection period is a current collection period of a receiver of the first data block set.

In one embodiment, the fifth message is a PC5-S message.

In one embodiment, the fifth message is an application layer message.

In one embodiment, the fifth message is a NAS message.

In one embodiment, the fifth message is transmitted via a PC5 interface.

In one embodiment, the fifth message is transmitted via a sidelink.

In one embodiment, the fifth message indicates a start time of the first collection period.

In one embodiment, the fifth message indicates a period of the first collection period.

In one embodiment, the fifth message indicates a time length of the first collection period.

In one embodiment, the fifth message indicates a reference time.

In one embodiment, the first charging information comprises time information of a current collection period.

In one subembodiment of the above embodiment, the time information comprises a timestamp.

In one embodiment, advantages of the above embodiment includes, different nodes can synchronize their own collection periods to reduce complexity of the core network to check charging information of different nodes, meanwhile, due to synchronization and other reasons, the adjustment of a collection period results in hopping in a length of a period, and first charging information can indicate a length of the collection period.

Embodiment 14

Figure 14:
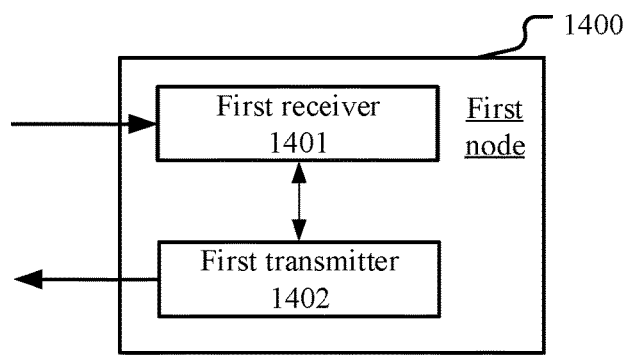
FIG. 14 illustrates a schematic diagram of a processing device in a first node according to one embodiment of the present disclosure.

Embodiment 14 illustrates a structure block diagram of a processing device in a first node according to one embodiment of the present disclosure; as shown in FIG. 14. In FIG. 14, a processing device 1400 in a first node comprises a first receiver 1401 and a first transmitter 1402. In Embodiment 14, the first receiver 1401 operates a first data block set; and
the first transmitter 1402 transmits first charging information;
herein, a size of data in the first data block set is used to generate the first charging information, the first charging information comprises a first ID set, and the first ID set comprises a first ID and a second ID; the first ID is a link layer ID; the operating action is receiving, a destination ID field of a MAC header of a MAC PDU used to carry the first data block set comprises at least partial bits in a first ID, when a destination link layer ID list maintained by a node indicated by the second ID comprises the first ID, the first ID identifies a receiver of the first data block set, and when a destination link layer ID list maintained by a node indicated by the second ID does not comprise the first ID, the first ID does not indicate a receiver of the first data block set; or, the operating action is transmitting, a source ID field of a MAC header of a MAC PDU used to carry the first data block set comprises at least partial bits in a first ID, when a source link layer ID list maintained by a node indicated by the second ID comprises the first ID, the first ID indicates a generator of the first data block set, and when a source link layer ID list maintained by a node indicated by the second ID does not comprise the first ID, the first ID does not indicate a generator of the first data block set.

In one embodiment, when the operating action is receiving, the first charging information is generated for data reception; and when the operating action is transmitting, the first charging information is generated for data transmission.

In one embodiment, the first charging information comprises first information, when the first charging information is generated for data reception, the first information is used to indicate whether the first ID identifies a receiver of the first data block set; when the first charging information is generated for data transmission, the first information is used to indicate whether the first ID identifies a generator of the first data block set.

In one embodiment, when the operating action is receiving and the first ID does not indicate a receiver of the first data block set, the second ID is used to indicate a receiver of the first data block set; when the operating action is transmitting and the first ID does not indicate a generator of the first data block set, the second ID is used to indicate a generator of the first data block set.

In one embodiment, when the operating action is receiving, the second ID is an IP address of a receiver of the first data block set; when the operating action is transmitting, the second ID is an IP address of a generator of the first data block set.

In one embodiment, the second ID is a first application layer ID, and the first application layer ID is an ID related to an application layer.

In one embodiment, the second ID is a first group ID, the first group ID identifies a first group, and the first group comprises a receiver of a first data block set and a generator of the first data block set.

In one embodiment, the second ID is a link layer ID.

In one embodiment, the second ID is a flow ID.

In one embodiment, when the operating action is receiving, and the first ID does not indicate a receiver of the first data block set, or, when the operating action is transmitting, and the first ID does not indicate a generator of the first data block set, the first charging information only comprises an IP address other than an IP address of the first node.

In one embodiment, when the operating action is receiving, and the first ID does not indicate a receiver of the first data block set, or, when the operating action is transmitting, and the first ID does not indicate a generator of the first data block set, the first charging information only comprises an application layer ID other than an application layer ID of the first node.

In one embodiment, when the operating action is receiving, and the first ID does not indicate a receiver of the first data block set, or, when the operating action is transmitting, and the first ID does not indicate a generator of the first data block set, the first charging information only comprises a link layer ID other than a link layer ID of the first node.

In one embodiment, when the first node has an IP address allocation function, the first transmitter 1402 transmits first message, and the first message configures an IP address of a transmitter of the first data block set; when the first node does not have an IP address allocation function, the first receiver 1401 receives a second message, and the second message indicates an IP address of a transmitter of the first data block set.

In one embodiment, an IP address of the first node and an IP address of a transmitter of the first data block set are at least the same in partial bits.

In one embodiment, the first transmitter 1402, transmits a fourth message, and the fourth message comprises at least one ID in the first ID set.

In one embodiment, the first receiver 1401 receives a third message, the third message is used to configure the first charging information, the third message is used to indicate a first collection period, the first data block set is operated within the first collection period, and the first transmitter 1402 generates the first charging information for the first collection period.

In one embodiment, the first receiver 1401, receives a first charging feedback message, and the first charging feedback message indicates received charging information.

In one embodiment, the first transmitter 1402, transmits a fifth message, and the fifth message is used to synchronize collection periods of different nodes.

In one embodiment, the first node is a UE.

In one embodiment, the first node is a terminal that supports large time delay differences.

In one embodiment, the first node is a terminal that supports NTN.

In one embodiment, the first node is an aircraft.

In one embodiment, the first node is a vehicle terminal.

In one embodiment, the first node is a relay.

In one embodiment, the first node is a vessel.

In one embodiment, the first node is a IoT terminal.

In one embodiment, the first node is a IIoT terminal.

In one embodiment, the first node is a device that supports transmission with low-latency and high-reliability.

In one embodiment, the first receiver 1401 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1402 comprises at least one of the antenna 452, the transmitter 454, the transmitting processor 468, the multi-antenna transmitting processor 457, the controller/processor 459, the memory 460 or the data source 467 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, satellite communication equipment, vessel communication equipment, NTN UEs, etc. The base station or system device in the present disclosure includes but is not limited to macro-cellular base stations, micro-cellular base stations, home base stations, relay base station, gNB (NR node B), Transmitter Receiver Point (TRP), NTN base stations, satellite equipment, flight platform equipment and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, operating a first data block set; and
a first transmitter, transmitting first charging information; wherein:
a size of data in the first data block set is used to generate the first charging information, the first charging information comprises a first identity (ID) set, and the first ID set comprises a first ID and a second ID;
the first ID is a link layer ID;
the operating action involves transmitting;
a source ID field of a MAC header of a MAC PDU used to carry the first data block set comprises at least partial bits in a first ID;
the first ID indicates the first node;
when a source link layer ID list maintained by a node indicated by the second ID comprises the first ID:
the first ID indicates a generator of the first data block set;
the first data block set is not relayed data;
the first node is a generator of the first data block set; and
the second ID indicates the first node; and
when the source link layer ID list maintained by the node indicated by the second ID does not comprise the first ID:
the first ID does not indicate the generator of the first data block set;
the generator of the first data block set is a node other than the first node;
the generator of the first data block set is a transmitter of the first data block before being relayed;
the first node is a relay; and
the first ID set comprises an ID other than the first ID and the second ID.

2. The first node according to claim 1, wherein:
when the operating action involves transmitting, the first charging information is generated for data transmission;
the first charging information comprises first information indicating whether the first data block set is relayed; and
when the first charging information is generated for data transmission, the first information is used to indicate whether the first ID identifies a generator of the first data block set.

3. The first node according to claim 1, wherein the first charging information is only for relayed data.

4. The first node according to claim 3, wherein:
the first transmitter transmits a second MAC PDU set;
the second MAC PDU set carries the first data block set;
the first charging information is generated for the first data block set being forwarded or relayed;
the first ID indicates the first node;
the first charging information comprises a fourth ID; and
the fourth ID indicates the generator of the first data block set.

5. The first node according to claim 3, wherein the source link layer ID list comprises at least one source link layer ID of a node indicated by the second ID, and the link layer ID comprises a Layer-2 ID.

6. The first node according to claim 3, wherein the second ID is a first group ID, the first group ID identifies a first group, and the first group comprises a receiver of the first data block set and a generator of the first data block set.

7. The first node according to claim 1, wherein the first node the first charging information comprises time information of a current collection period, and the time information comprises a timestamp.

8. The first node according to claim 1, wherein the source link layer ID list comprises at least one source link layer ID of a node indicated by the second ID, and the link layer ID comprises a Layer-2 ID.

9. The first node according to claim 1, wherein when the operating action is transmitting, the first charging information is generated for data transmission,
when the operating action is transmitting and the first ID does not indicate a generator of the first data block set, the first charging information only comprises an application layer ID other than an application layer ID of the first node.

10. The first node according to claim 1, comprising:
the first receiver, receiving a third message, the third message being used to configure the first charging information, the third message being used to indicate a first collection period, the first data block set being operated within the first collection period, and
the first transmitter, generating the first charging information for the first collection period;
the first transmitter, transmitting a fifth message, the fifth message being used to synchronize collection periods of different nodes.

11. The first node according to claim 10, wherein the third message explicitly indicates a time length of the collection period; the third message does not indicate a start time of the collection period, and a receiver of the third message determines a start time of the collection period.

12. The first node according to claim 11, wherein the first receiver receives a first charging feedback message, the first charging feedback message indicates received charging information; the first charging feedback message indicates a collection period during which charging information is not received; the first charging feedback message indicates that charging information not being received is used to trigger the first node to retransmit charging information.

13. The first node according to claim 12, wherein:
the first receiver receives a first MAC PDU set;
the first MAC PDU set is transmitted via a Uu interface; and
the first MAC PDU set carries the first data block set.

14. The first node according to claim 13, wherein:
the first transmitter transmits a second MAC PDU set;
the second MAC PDU set carries the first data block set;
the first charging information is generated for the first data block set being forwarded or relayed;
the first ID indicates the first node;
the first charging information comprises a fourth ID; and
the fourth ID indicates the generator of the first data block set.

15. The first node according to claim 10, wherein a result obtain after a size of data of the first data block set is processed by a filter is comprised in the first charging information, where the filter is configured by the network.

16. The first node according to claim 10, wherein the first charging information comprises a value of a product of the size of data in the first data block set and a fixed number.

17. The first node according to claim 10, wherein
when the operating action is transmitting, and the first data block set is relayed data, the first ID is used to indicate the first node, a generator of the first data block set is a transmitter of the first data before being relayed, the generator of the first data block set is a node other than the first node, and the second ID is used to indicate a receiver of the first data block set; the first information indicates data when the first data block set is relayed.

18. The first node according to claim 1, wherein when the first node has an IP address allocation function, the first transmitter transmits first information, and the first message configures an IP address of a transmitter of the first data block set; when the first node does not have an IP address allocation function, the first receiver receives a second message, and the second message indicates an IP address of a transmitter of the first data block set.

19. The first node according to claim 1, wherein:
the first transmitter transmits a second MAC PDU set;
the second MAC PDU set carries the first data block set;
the first charging information is generated for the first data block set being forwarded or relayed;
the first ID indicates the first node;
the first charging information comprises a fourth ID; and
the fourth ID indicates the generator of the first data block set.

20. A method in a first node for wireless communications, comprising:
operating a first data block set; and
transmitting first charging information; wherein:
a size of data in the first data block set is used to generate the first charging information;
the first charging information comprises a first ID set;
the first ID set comprises a first ID and a second ID;
the first ID is a link layer ID;
the operating action involves transmitting;
a source ID field of a MAC header of a MAC PDU used to carry the first data block set comprises at least partial bits in a first ID;
the first ID indicates the first node;
when a source link layer ID list maintained by a node indicated by the second ID comprises the first ID:
the first ID indicates a generator of the first data block set;
the first data block set is not relayed data;
the first node is a generator of the first data block set; and
the second ID indicates the first node; and
when a source link layer ID list maintained by a node indicated by the second ID does not comprise the first ID:
the first ID does not indicate a generator of the first data block set;
the generator of the first data block set is a node other than the first node;
the generator of the first data block set is a transmitter of the first data block before being relayed;
the first node is a relay; and
the first ID set comprises an ID other than the first ID and the second ID.

* * * * *